United States Patent
Banerjee et al.

(10) Patent No.: US 10,721,336 B2
(45) Date of Patent: Jul. 21, 2020

(54) TRANSACTION ANALYZER USING GRAPH-ORIENTED DATA STRUCTURES

(71) Applicant: The Western Union Company, Englewood, CO (US)

(72) Inventors: Abhishek Banerjee, San Francisco, CA (US); Daniel Goldstein, San Francisco, CA (US); Roberto Arnetoli, San Francisco, CA (US); Pravin Darbare, San Ramon, CA (US); Kevin Lai, San Francisco, CA (US); Sanjay Saraf, San Jose, CA (US)

(73) Assignee: The Western Union Company, Denver, CO (US)

( * ) Notice: Subject to any disclaimer, the term of this patent is extended or adjusted under 35 U.S.C. 154(b) by 470 days.

(21) Appl. No.: 15/403,414

(22) Filed: Jan. 11, 2017

(65) Prior Publication Data

US 2018/0196694 A1 Jul. 12, 2018

(51) Int. Cl.
*H04L 29/06* (2006.01)
*G06F 13/16* (2006.01)
*G06Q 20/40* (2012.01)
*G06F 9/46* (2006.01)

(52) U.S. Cl.
CPC .............. *H04L 67/42* (2013.01); *G06F 9/466* (2013.01); *G06F 13/1642* (2013.01); *G06Q 20/4016* (2013.01)

(58) Field of Classification Search
None
See application file for complete search history.

(56) References Cited

U.S. PATENT DOCUMENTS

| | | | |
|---|---|---|---|
| 9,298,806 B1* | 3/2016 | Vessenes | G06Q 30/00 |
| 9,824,031 B1* | 11/2017 | Ganti | G06F 21/00 |
| 10,129,274 B2* | 11/2018 | Sheth | H04L 43/00 |
| 2016/0210631 A1* | 7/2016 | Ramasubramanian | G06Q 20/4016 |
| 2016/0350758 A1* | 12/2016 | Zoldi | G06Q 20/382 |
| 2017/0053294 A1* | 2/2017 | Yang | G06Q 20/4016 |
| 2017/0061458 A1* | 3/2017 | Elangovan | G06Q 50/22 |
| 2017/0132635 A1* | 5/2017 | Caldera | G06Q 20/4016 |

(Continued)

OTHER PUBLICATIONS

Spagnuolo, M. et al. "Bitiodine: Extracting intelligence from the bitcoin network". Mar. 2014. In International Conference on Financial Cryptography and Data Security (pp. 457-468). Springer, Berlin, Heidelberg. (Year: 2014).*

*Primary Examiner* — Lewis A Bullock, Jr.
*Assistant Examiner* — Gilles R Kepnang
(74) *Attorney, Agent, or Firm* — Kilpatrick Townsend & Stockton, LLP

(57) ABSTRACT

Techniques described herein relate to generating graph-oriented data structures based on cross-channel multi-user transaction and/or interaction data from one or more data sources, Additional techniques relate to analyzing and processing transactions using the graph-oriented data structures. Transaction data may be received from various data sources, and analyzed to determine subsets of the transaction data relating to interactions between specific pairs of users. Graph-oriented data structures may be generated based on the subsets of transaction data relating to the specific pairs of users, and may be used to analyze and process transaction requests.

20 Claims, 11 Drawing Sheets

(56) References Cited

U.S. PATENT DOCUMENTS

2017/0132636 A1* 5/2017 Caldera .............. G06Q 20/4016
2017/0236079 A1* 8/2017 Venna ................. G06F 16/2428
705/4

* cited by examiner

TRANSACTION ANALYZER USING GRAPH-ORIENTED DATA STRUCTURES

BACKGROUND OF THE INVENTION

Field of the Invention

The present invention relates generally to processing transactions using graph-oriented data structures generated based on cross-channel multi-user transaction and/or interaction data. Using the graph-oriented data structures, the various entities related to a transaction may be analyzed and additional data associated with a transaction may be retrieved.

Description of the Related Art

Aspects described herein relate to analyzing and processing secure data transfers and other transactions within various computing and networking environments. Currently, many independent transaction systems may support and record single user transactions and multi-user transactions and/or interactions. Examples of such systems include communication and/or networking systems configured to support and monitor communication sessions and transmission between users and devices, social networking systems configured to store and provide social network content and support social networking interactions, financial systems configured to support single user and multi-user financial transactions, and the like. Further, each of the example systems above may support user transactions/interactions via one or more different communication channels, such as web-based client computing sessions, mobile applications executing on mobile devices, secure embedded application portals executing within other applications, specialized kiosk-devices, agent-assisted client terminals, etc.

The transaction records stored by systems such as those noted above may include large amounts of data generated by the various different hardware devices (e.g., servers, storage, and network devices) and software applications (e.g., operating systems, firmware, device drivers, middleware, and user applications) operating in data centers associated with these systems. Such data may be archived on storage devices and retrieved by systems having different manufacturers, configured at different times and in different situations, operating under different conditions, and residing in different geographic locations. Additionally, some or all such systems may combine legacy hardware, software, storage, and communications networks, with newly implemented systems. Therefore, various transaction systems (e.g., communication systems, social networking systems, financial transaction systems, etc.) may use different storage systems, different authentication and parsing techniques, and/or various different techniques for decoding, decrypting, unpacking, parsing and reformatting the transaction data, based on the respective characteristics of the hardware and/or software system(s) used.

BRIEF SUMMARY

Aspects described herein relate to generating graph-oriented data structures based on cross-channel multi-user transaction and/or interaction data from one or more data sources, and further to analyzing and processing transactions using the graph-oriented data structures. Specifically, various techniques (e.g., systems, methods, computer-program products tangibly embodied in a non-transitory machine-readable storage medium, etc.) are described herein for receiving, analyzing, and storing transaction data received from various data sources. In some embodiments, a transaction analyzer server may receive various transaction data from one or more data source servers, and may analyze the data to determine subsets of the transaction data relating to interactions between specific pairs of users. As noted above, such transaction data may include previous secured data transfers, and other multi-user transactions and interactions from communication systems, social networking systems, financial systems, digital asset systems, and the like. Such transaction data also may relate to previous transactions and/or interactions between the specific pairs of users occurring via multiple different communication channels. Based on the determined subsets of transaction data relating to the specific pairs of users, one or more graph-oriented data structures may be generated, including nodes corresponding to transaction entities (e.g., users, devices, data transfers, communication channels, etc.), and edges defining connections between the nodes/entities.

Additional aspects described herein relate to techniques for analyzing and processing transaction requests by a transaction analyzer server using graph-oriented data structures corresponding to transaction/interaction data between specific pairs of users. In certain embodiments, a transaction analyzer server may receive transaction requests including data identifying one or more entities associated with requested transactions. The transaction analyzer server may compare the received entity data associated with the requested transactions to the pluralities of nodes corresponding to entities within the various graph-oriented data structures, and then traverse the various graph-oriented data structures using a graph algorithm, to determine the entity relationships and retrieve additional related data from the graph-oriented data structures. The determined entity relationships and additional data retrieved from the graph-oriented data structures may be used by the transaction analyzer server to process the transaction requests, for example, by determining user pair scores, approving or rejecting the transaction requests based on the user pair scores, and/or postponing resolution of the transaction requests until after determining an updated user pair score at a later point in the transaction requests process.

Figure 1:
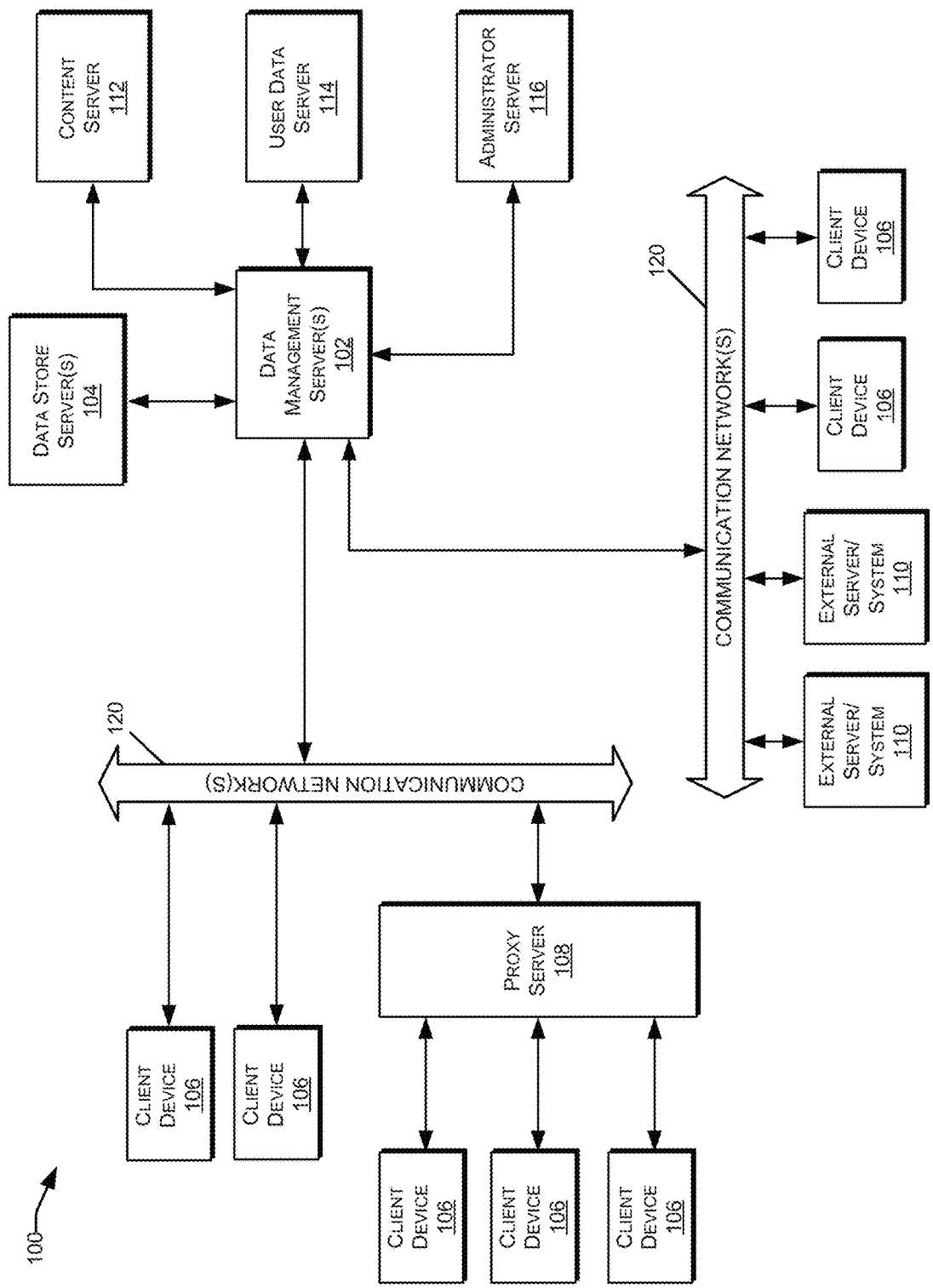
FIG. 1 is a block diagram illustrating an example of an electronic data transfer network, according to one or more embodiments of the disclosure.

It is noted that any of the elements and/or steps provided in the block diagrams, flow diagrams, method diagrams, and other illustrations of the figures may be optional, replaced, and/or include additional components, such as combined and/or replaced with other elements and/or steps from other figures and text provided herein. Various embodiments of the present invention are discussed below, and various combinations or modifications thereof may be contemplated.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Various techniques (e.g., systems, methods, computer-program products tangibly embodied in a non-transitory computer-readable storage medium, etc.) are described herein for generating graph-oriented data structures based on cross-channel multi-user transaction and/or interaction data from one or more data sources, and for analyzing and processing transactions using the graph-oriented data structures. Specifically, various techniques are described herein for receiving, analyzing, and storing transaction data received from various data sources. In some embodiments, a transaction analyzer server may receive various transaction data from one or more data source servers, and may analyze the data to determine subsets of the transaction data relating to interactions between specific pairs of users. As noted above, such transaction data may include previous secured data transfers, and other multi-user transactions and interactions from communication systems, social networking systems, financial systems, digital asset systems, and the like. Such transaction data also may relate to previous transactions and/or interactions between the specific pairs of users occurring via multiple different communication channels. Based on the determined subsets of transaction data relating to the specific pairs of users, one or more graph-oriented data structures may be generated, including nodes corresponding to transaction entities (e.g., users, devices, data transfers, communication channels, etc.), and edges defining connections between the nodes/entities.

Additional techniques described herein relate to analyzing and processing transaction requests by a transaction analyzer server using graph-oriented data structures corresponding to transaction/interaction data between specific pairs of users. In certain embodiments, a transaction analyzer server may receive transaction requests including data identifying one or more entities associated with requested transactions. The transaction analyzer server may compare the received entity data associated with the requested transactions to the pluralities of nodes corresponding to entities within the various graph-oriented data structures, and then traverse the various graph-oriented data structures using a graph algorithm, to determine the entity relationships and retrieve additional related data from the graph-oriented data structures. The determined entity relationships and additional data retrieved from the graph-oriented data structures may be used by the transaction analyzer server to process the transaction requests, for example, by determining user pair scores, approving or rejecting the transaction requests based on the user pair scores, and/or postponing resolution of the transaction requests until after determining an updated user pair score at a later point in the transaction requests process.

With reference now to FIG. 1, a block diagram is shown illustrating various components of an electronic data transfer network 100 which implements and supports certain embodiments and features described herein. As discussed below in more detail, various embodiments of electronic data transfer networks 100 may be implemented and configured to perform secure data transfers between client devices 106, system servers (e.g., 102), and/or external systems 110. In some embodiments, the various computing devices and systems shown in FIG. 1 may correspond to different physical or virtual domains/regions, for instance, different geographic areas within different jurisdictions, different data centers, different networks, different computing infrastructures, etc. As described herein, secure data transfers may include transfers of various different types of data items (e.g., files, database records, media or other content resources, etc.), as well as other secure data transactions or other interactions between a sender and receiver devices/servers. In some embodiments, the electronic transfer network 100 may be configured to operate as a value transfer system by which users at client devices 106 may initiate value transfers to users at other client devices 106. In such cases, management servers 102 and/or external systems 110 may correspond to secure systems operated by financial institutions or other entities, by which sender and receiver credentials and value transfer requests may be received and analyzed, and value-based transactions may be authorized and performed.

Thus, in various embodiments, electronic data transfer network 100 may be configured to support and perform transfers of various currency types, including traditional and/or digital currencies, centralized and/or de-centralized currencies, cryptocurrencies, and any other medium of exchange (e.g., credit, gift cards or certificates, points in a user point system, etc.), between client devices 106 and/or external systems 110 in different areas, regions, or jurisdictions. In other embodiments, the electronic transfer network 100 may be configured to perform other types of multi-party data transfers and/or secure transactions, such as transfers of data items including secure files, records, and/or content resources, between client devices 106 and other client devices 106, management servers 102 and/or external systems 110. For such transfers, the endpoint systems may be operating in the same location, using the same communication networks 120, and/or using the same computing hardware and software infrastructure, or may operate in different locations, on different networks, and/or in different datacenters, etc. Data management servers 102 and related servers (e.g., 104, 108, 112, 114, 116, etc.) in some embodiments, may correspond to authentication systems, data access/permission systems, subscription monitor systems, network access providers, and/or any other servers that may be used to monitor, permit/deny access, and/or enable data transfers. In still other embodiments, network 100 may be implemented as part of interactive gaming systems, eCommerce systems, educational and professional training systems, and/or social networking systems, to enable the transfer of certain data or values (e.g., points, credits, resources, etc.) between users on different systems and/or in different locations.

As shown in FIG. 1, electronic data transfer network 100 may include one or more data management servers 102. Data management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Data management servers 102 may include one or more server farms, clusters, or any other appropriate arrangement and/or combination or computer servers. Data management servers 102 may act according to stored instructions located in a memory subsystem of the servers 102, and may run an operating system, including any commercially available server operating system and/or any other operating systems discussed herein.

The electronic transfer network 100 may include one or more data store servers 104, such as database servers and file-based storage systems. Data stores 104 may comprise stored data relevant to the functions of the electronic transfer network 100. Illustrative examples of data stores 104 that may be maintained in certain embodiments of the electronic transfer network 100 are described below in reference to FIG. 4. In some embodiments, multiple data stores may reside on a single server 104, either using the same storage components of server 104 or using different physical storage components to assure data security and integrity between data stores. In other embodiments, each data store may have a separate dedicated data store server 104.

Electronic data transfer network 100 also may include one or more client devices 106. Client devices 106 may display data received via the electronic data transfer network 100, and may support various types of user interactions with the data. Client devices 106 may include mobile computing devices such as smartphones, tablet computers, personal digital assistants, and wearable computing devices. Such mobile computing devices may run a variety of mobile operating systems, and may be enabled for Internet, e-mail, short message service (SMS), Bluetooth®, mobile radio-frequency identification (M-RFID), and/or other communication protocols. Other client devices 106 may be general purpose personal computers or special-purpose computing devices including, by way of example, personal computers, laptop computers, workstation computers, projection devices, and interactive room display systems. Additionally, client devices 106 may be any other electronic devices, such as thin-client computers, Internet-enabled gaming systems, business or home appliances, and/or personal messaging devices, capable of communicating over network(s) 120. In some embodiments, one or more client devices 106 may include digital kiosk devices such as point-of-sale terminals, value transfer terminals, and/or digital advertising or display devices, including some or all of the features described below in reference to FIG. 2.

In different contexts of electronic transfer networks 100, client devices 106 may correspond to different types of specialized devices, for example, employee devices and presentation devices in a company network, gaming devices in a gaming network, networked point-of-sale terminals, transaction performing or staging terminals, and/or digital advertising terminals in a network, etc. In some embodiments, client devices 106 may operate in the same physical location, such as the conference room or household. In such cases, the devices 106 may contain components that support direct communications with other nearby devices 106, such as a wireless transceivers and wireless communications interfaces, Ethernet sockets or other Local Area Network (LAN) interfaces, etc. In other implementations, the client devices 106 need not operate at the same physical location, but may be used in remote geographic locations in which each client device 106 may use security features and/or specialized hardware (e.g., hardware-accelerated SSL and HTTPS, WS-Security, firewalls, etc.) to communicate with the data management server 102 and/or other remotely located client devices 106. Additionally, different client devices 106 may be assigned different designated roles, such as sender devices, receiver devices, administrator devices, or the like, and in such cases the different devices may be provided with additional hardware and/or software components to provide content and support user capabilities not available to the other devices.

The electronic data transfer network 100 also may include one or more proxy servers 108 configured to operate between a set of related client devices 106 and the back-end server(s) 102. In some cases, proxy server 108 may maintain private user information for client devices 106 interacting with applications or services hosted on other servers. For example, the proxy server 108 may be used to maintain private data of a user within one jurisdiction even though the user is accessing an application hosted on a server (e.g., the data management server 102) located outside the jurisdiction. In such cases, the proxy server 108 may intercept communications between multiple different client devices 106 and/or other devices that may include private user information. The proxy server 108 may create a token or identifier that does not disclose the private information and may use the token or identifier when communicating with the other servers and systems, instead of using the user's private information.

The electronic data transfer network 100 also may include one or more external servers/systems 110 configured to connect to the back-end server(s) 102 through various communication networks 120 and/or through proxy servers 108. External servers/systems 110 may include some or all of the same physical and logical components as the data management server(s) 102, and may be configured to provide various data sources and/or services to the other components of the electronic transfer network 100.

As illustrated in FIG. 1, the data management server 102 may be in communication with one or more additional servers, such as a content server 112, a user data server 112, and/or an administrator server 116. Each of these servers may include some or all of the same physical and logical components as the data management server(s) 102, and in some cases, the hardware and software components of these servers 112-116 may be incorporated into the data management server(s) 102, rather than being implemented as separate computer servers.

Content server 112 may include hardware and software components to generate, store, and maintain the content resources for distribution to client devices 106 and other devices in the network 100. For example, in electronic data transfer networks 100 used for distribution of media content, advertising, and the like, a content server 112 may include media and advertising content files. In electronic transfer networks 100 used for professional training and educational purposes, content server 112 may include data stores of digital content, training materials, presentations, interactive programs and simulations, and various user interfaces that correspond to different content and/or different types of user devices 106.

User data server 114 may include hardware and software components that store and process data for multiple users relating to each user's activities and usage of the electronic data transfer network 100. For example, the data management server 102 may record and track each user's system usage, including their client device 106, their transaction history, the data accessed and transferred by the user, and the user's interactions with other client devices 106. This data may be stored and processed by the user data server 114, to support user tracking and analysis features. For instance, in the context of transaction analyzer systems, the user data server 114 may store and analyze each user's completed and attempted transactions (e.g., communication/network sessions, data transfers, social networking interactions, eCommerce or financial transactions, etc.), as well as content requested, view, interactions with other devices/systems, and the like. In the context of professional training or educational content, advertising, media distribution, and interactive gaming, the user data server 114 may store and process resource access data for multiple users (e.g., data files accessed, access times, data usage amounts, user histories, user devices and device types, etc.).

Administrator server 116 may include hardware and software components to initiate various administrative functions at the data management server 102 and other components within the network 100. For example, the administrator server 116 may monitor device status and performance for the various servers, data stores, and/or client devices 106 in the electronic data transfer network 100. When necessary, the administrator server 116 may add or remove devices from the network 100, and perform device maintenance such as providing software updates to the devices in the network 100. Various administrative tools on the administrator server 116 may allow authorized users to set user access permissions to various data resources, monitor resource usage by users and devices 106, and perform analyses and generate reports on specific network users and/or devices (e.g., resource usage tracking reports, training evaluations, etc.).

The electronic data transfer network 100 may include one or more communication networks 120. Although two networks 120 are identified in FIG. 1, the electronic transfer network 100 may include any number of different communication networks between any of the computer servers and devices shown in FIG. 1 and/or other devices described herein. Communication networks 120 may enable communication between the various computing devices, servers, and other components of the electronic data transfer network 100. As discussed below, various implementations of electronic data transfer networks 100 may employ different types of networks 120, for example, computer networks, telecommunications networks (e.g., cellular), mobile wireless data networks, and any combination of these and/or other networks.

As noted above, in certain embodiments, electronic data transfer network 100 may be a cryptocurrency network or other network using encryption protocols and techniques for performing transfers of cryptocurrency and/or other alternative digital currencies. Illustrative and non-limiting examples of such cryptocurrency networks may include a bitcoin peer-to-peer (P2P) payment network, a Litecoin network, a Peercoin network, and various other private digital cryptocurrency networks. The various computing devices and servers in such cryptocurrency networks 100, including client devices 106, management servers 102, and/or external systems 110, may be configured to perform cryptocurrency transfers as senders and/or receivers. For example, a client device 106 may securely store a private cryptographic key associated with a cryptocurrency account of a user, and may use specialized client software (e.g., cryptocurrency wallet application) to generate digital cryptographic signatures using the private cryptographic key and data identifying the details of the requested cryptocurrency transfer. In some cases, the cryptocurrency client application may execute a cryptographic hash function to generate a hash value signature based on the private key value associated with the cryptocurrency account. Recipient client devices 106, as well as other servers/systems in the network 100, may use the public key of the sender to decrypt the cryptographic signature and verify the authenticity of the requested cryptocurrency transfer. Some or all of the client devices 106, servers 102, and/or external systems 110 may use databases or other secure storage to independently maintain and update electronic ledgers for tracking the current balances associated with cryptocurrency accounts.

In some embodiments, certain computing devices and servers in a cryptocurrency network 100 may function as miner systems that are configured to perform complex mathematical operations in order to produce new cryptocurrency. Thus, various client devices 106, servers 102, and/or external systems 110 may be implemented as cryptocurrency miners. In some cases, these devices/systems may include specialized hardware and software designed for cryptocurrency mining, such as application-specific integrated circuits (ASICs) that are specifically designed and configured for cryptocurrency mining and/or specialized cryptocurrency mining software. In some cases, specialized cryptocurrency mining software may be used to allow collaboration between multiple different devices/systems which may function as a mining pool.

In some embodiments, various computing devices and servers in a cryptocurrency network 100 may be configured to collaboratively generate and store universal public ledgers and/or transaction chains for the cryptocurrency network 100. For example, computing devices and systems within the cryptocurrency network 100 may be configured to retrieve individual cryptocurrency transactions from a pool, and resolve the transactions by solving associated mathematical problems such as cryptographic hashes. After the problem is solved, the associated cryptocurrency transaction may be added to a universal transaction chain which is shared by other devices and systems of the cryptocurrency network 100. Each device/system in the cryptocurrency network 100 may independent maintain a copy of the transaction chain, and may periodically (or upon request from other systems) share their copy of the transaction chain in order to synchronize and reconcile different versions.

In some embodiments, a transaction chain for a cryptocurrency system/network may be stored in a distributed database by multiple different data nodes at different devices/servers within the network 100. For example, blockchain technology may be used to implement a decentralized distributed database which may be hosted by a combination of client devices 106, data management servers 102, and/or external systems 110. The blockchain (or other decentralized storage system) may store a distributed electronic ledger and/or universal transaction chain for the cryptocurrency network 100. The blockchain may be accessed by individual client software (e.g., wallet applications) of client devices 106, which may propose a cryptocurrency value transfer to be added to the blockchain. After analyzing and authorizing the requested transfer (e.g., by confirming that there is sufficient cryptocurrency value in the sender's account), a miner node within the cryptocurrency network 100 may bundle the transfer with other transactions to create a new block to be added to the blockchain. In some cases, adding blocks to the blockchain may involve miner nodes repeatedly executing cryptographic hash functions, ensuring that the blockchain cannot be tampered with by any malicious systems within the network 100.

As noted above, the client devices 106 in the electronic transfer network 100 may include various mobile computing devices, such as smartphones, tablet computers, personal digital assistants, wearable computing devices, bodily implanted communication devices, vehicle-based devices, etc. Within an electronic data transfer network 100, mobile computing devices 106 may be configured to support mobile payment and/or mobile money transfer functionality. Such mobile devices 106 may initiate and receive communications via the Internet, e-mail, short message service (SMS), Bluetooth®, mobile radio-frequency identification (M-RFID), near-field communication (NFC) and/or various other communication protocols. In some cases, mobile devices 106 may execute a mobile wallet application to store user data and support secure data and/or value transfers via various different techniques, for example, SMS-based transactional payments, direct mobile billing, Web Application Protocol mobile payments, and NFC-based payments.

In some examples, the electronic data transfer network 100 shown in FIG. 1 may correspond to an interactive user platform, such as a social networking platform or messaging platform. In such cases, an electronic transfer technology platform may be integrated within the social networking and/or messaging platform 100, in order to provide interactive users with the capabilities to perform quick and convenient value transfers with other users anywhere in the world. Such embodiments may apply to various different collaborative user platforms and applications, including social media applications, email applications, chat and messaging applications, online gaming applications, and the like. These applications may be executed on client devices 106 and may transmit communications to and/or establish communication sessions with corresponding applications on other client devices 106 and/or external systems 110. In some embodiments, the secure data and/or value transfer capabilities of one or more transfer services providers may be embedded into various collaborative user platforms. For example, from within a social networking or messaging application running on client device 106, a user may be able to request and fund value transfers utilizing a debit card, credit card, or bank account, and easily direct the funds to another user on the same collaborative platform, or to retail agent location and/or to a mobile wallet or bank account. Integration of secure value transfer technologies within social networking applications, messaging applications, and the like, may provide a cross-border platform for transfer services that enables pay-in and pay-out capabilities that leverage technology, foreign exchange conversion, data management, as well as regulatory, compliance and anti-money laundering (AML) infrastructure of the transfer service provider, to expedite efficient and timely transfers. In such cases, the technology platform used to support secure data and/or value transfers within the network 100 may be accessible to messaging, social, and other digital networks, and may offer a suite of APIs built on a highly scalable infrastructure, enabling fast deployment of domestic and cross-border remittance capabilities.

Figure 2:
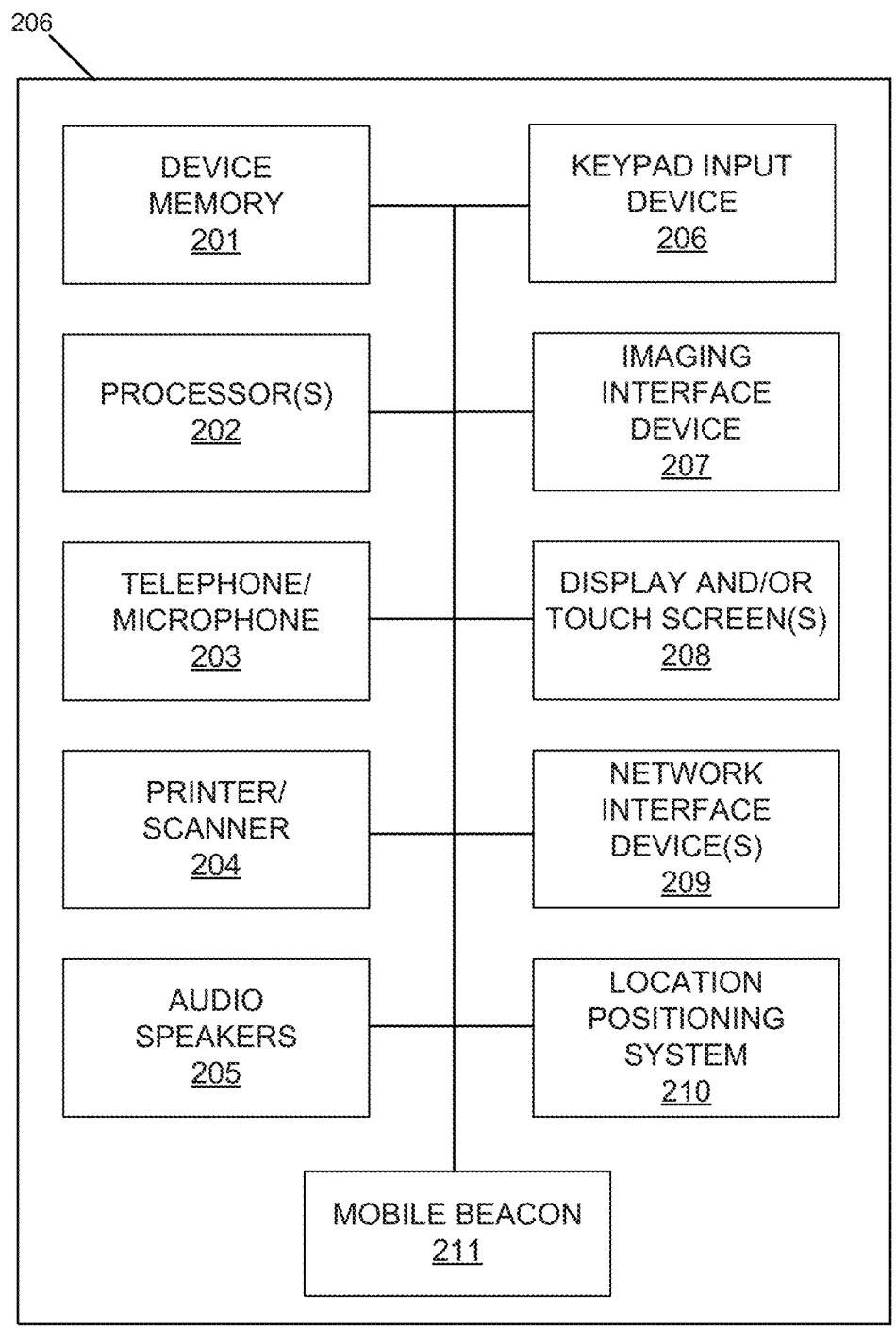
FIG. 2 is a block diagram illustrating various components and features of an example transaction client device, according to one or more embodiments of the disclosure.

Referring now to FIG. 2, a simplified block diagram is illustrating showing a transaction client device 206. In some embodiments, a transaction client device may be a digital kiosk system or other example of a client device. For example, a digital kiosk 206 may be implemented, for example, as a kiosk in a retail store or other location, a value transfer terminal for performing value transfers (e.g., transfers of money and other assets, submitting payments to payees, etc.), a point-of-sale terminal, an electronic advertising system, and/or other various electronic display systems. Digital kiosk devices 206 and other transaction client devices 206 may be operated by a user (e.g., customer, shopper), and/or by agent, employee, or representative of a business providing or operating the kiosk 206. In various embodiments, transaction client devices 206 may include one or more of: a memory system 210, a processing unit 211, a telephone/microphone I/O component system 212, a printer/scanner I/O component system 213, an audio speaker system 214, a keypad input device 215, an imaging interface device 216, one or more digital display screens 217, one or more network interface devices 218 (e.g., network interface controllers, RF transceivers, etc.), a digital positioning system 219 (e.g., Global Positioning System (GPS) receiver device), and/or a mobile beacon device 220.

In some embodiments, a transaction client device 206 may include a touch screen that functions as the display screen 217 and/or the keypad 215. The keypad 215 may instead be any device that accepts user input, such as a trackball, mouse, or joystick. The imaging interface device 216 may serve to allow the client device 206 to communicate with an imaging device. Alternatively, an imaging device may be directly incorporated into the transaction client device 206. Speakers 214 may be any audio output device. The printer 213 may be used to provide the user a receipt, point-of-sale information (e.g., product information, order confirmation, etc.), coupon, advertisement, or other information to be taken with the user, and scanner 213 may be used to scan a QR Code or barcode identifying a user or transaction, transfer request, user identification card, coupon, or the like. In some embodiments, a telephone/microphone 212 may be used in conjunction with speakers 214 to interact with the transaction client device 206, or a remotely located user (e.g., counterpart user in a transaction, customer representative, etc.) when performing a transfer or requesting information.

Transaction client devices 206 may include various different types of positioning systems 219 (or geo-location systems 219), such as a Global Positioning System (GPS) receiver, so that device location data may be collected and transmitted to data management servers 102 and/or other client devices 106. In some cases, such location data may be used to determine which content a specific client devices 206 is permitted to receive (e.g., based on domain/jurisdiction), and also may be used to determine factors such as language, data availability, network availability, product availability, and the like.

Additionally, certain client devices 206 (e.g., kiosk systems 206) may include one or more mobile beacon 220. Mobile beacon 220 may be configured to communicate with various mobile computing devices 106 (e.g., mobile phones, tablet computers, wearable computers, etc.) that are detected near the mobile beacon 220. Mobile beacon 220 may one or more short-range wireless technologies to detect and communicate with nearby mobile devices 106, for example, RFID and/or Bluetooth low-energy (BLE) wireless technology. For instance, mobile beacon 220 may transmit a BLE signal that may be detected by a particular mobile application installed on a mobile device 106. In some cases, authentication and user permission for the communication link may be obtained via the particular mobile application on the user's device, after which the mobile beacon 220 and the nearby device may communicate to identify the user's location with respect to the mobile beacon 220 (e.g., the user's precise location), and to transmit targeted content from the mobile beacon 220 to the user's mobile device 106.

Figure 3:
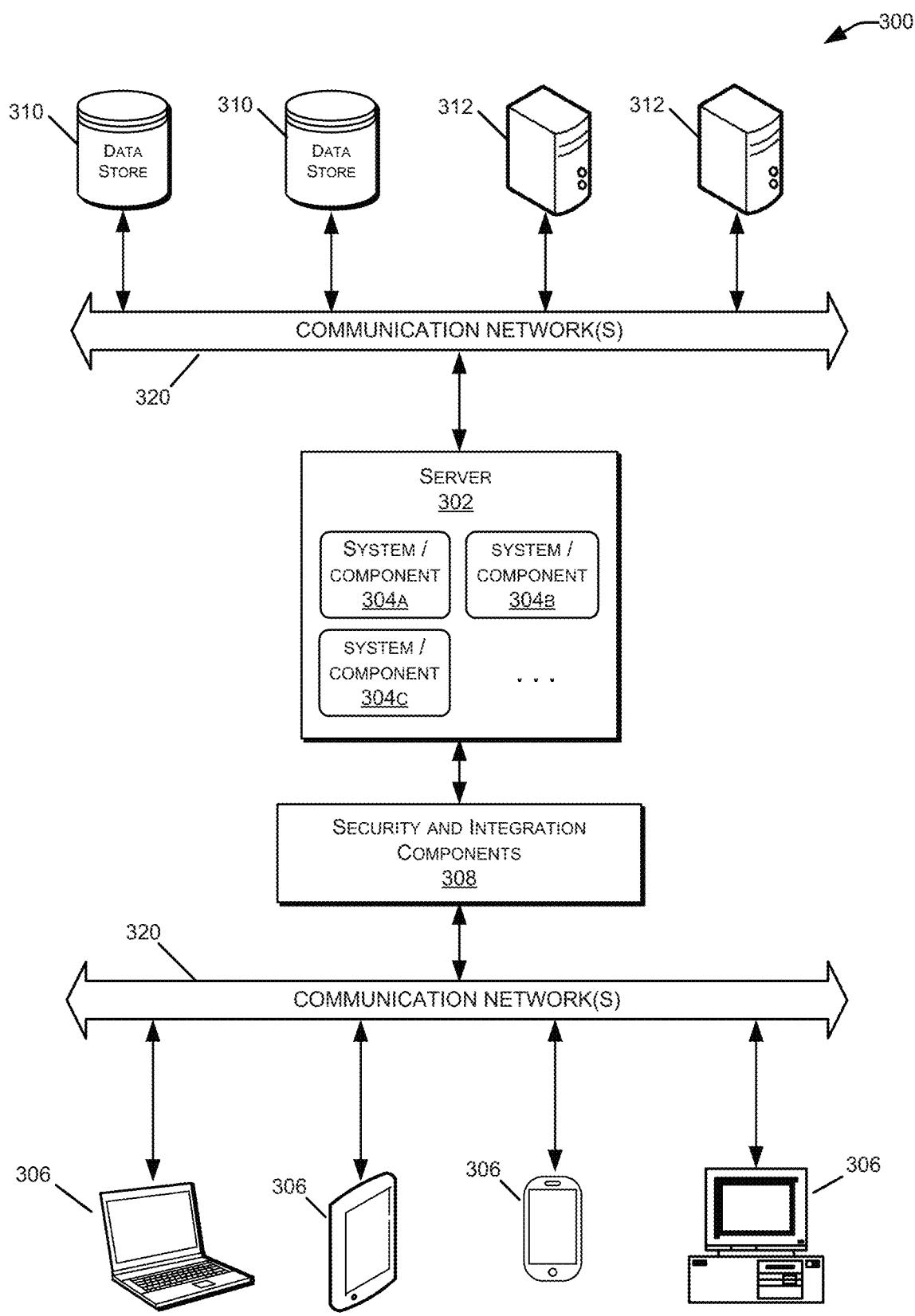
FIG. 3 is a block diagram illustrating a computer server and computing environment within an electronic data transfer network, according to one or more embodiments of the disclosure.

With reference to FIG. 3, an illustrative distributed computing environment 300 is shown including a computer server 302, four client computing devices 306, and other components that may implement certain embodiments and features described herein. In some embodiments, the server 302 may correspond to the data management server 102 discussed above in FIG. 1, and the client computing devices 306 may correspond to the client devices 106 (e.g., client terminals, mobile computing devices, and/or digital kiosk systems, etc.). However, the computing environment 300 illustrated in FIG. 3 also may correspond to any other combination of devices and servers configured to implement a client-server model or other distributed computing architecture.

Client devices 306 may be configured to receive and execute client applications over one or more networks 320. Such client applications may be web browser based applications and/or standalone software applications, such as mobile device applications. Server 302 may be communicatively coupled with the client devices 306 via one or more communication networks 320. Client devices 306 may receive client applications from server 302 or from other application providers (e.g., public or private application stores). Server 302 may be configured to run one or more server software applications or services, for example, web-based or cloud-based services, to support content distribution and interaction with client devices 306. Users operating client devices 306 may in turn utilize one or more client applications (e.g., virtual client applications) to interact with server 302 to utilize the services provided by these components.

Various different subsystems and/or components 304 may be implemented on server 302. Users operating the client devices 306 may initiate one or more client applications to use services provided by these subsystems and components. The subsystems and components within the server 302 and client devices 306 may be implemented in hardware, firmware, software, or combinations thereof. Various different system configurations are possible in different distributed computing systems 300 and electronic transfer networks 100. The embodiment shown in FIG. 3 is thus one example of a distributed computing system and is not intended to be limiting.

Although exemplary computing environment 300 is shown with four client computing devices 306, any number of client computing devices may be supported. Such client devices 306 may include client devices including some or all of the features described below in reference to FIG. 2. Other devices, such as specialized sensor devices, etc., may interact with client devices 306 and/or server 302.

As shown in FIG. 3, various security and integration components 308 may be used to send and manage communications between the server 302 and user devices 306 over one or more communication networks 320. The security and integration components 308 may include separate servers, such as web servers and/or authentication servers, and/or specialized networking components, such as firewalls, routers, gateways, load balancers, and the like. In some cases, the security and integration components 308 may correspond to a set of dedicated hardware and/or software operating at the same physical location and under the control of same entities as server 302. For example, components 308 may include one or more dedicated web servers and network hardware in a datacenter or a cloud infrastructure. In other examples, the security and integration components 308 may correspond to separate hardware and software components which may be operated at a separate physical location and/or by a separate entity.

Security and integration components 308 may implement various security features for data transmission and storage, such as authenticating users and restricting access to unknown or unauthorized users. In various implementations, security and integration components 308 may provide, for example, a file-based integration scheme or a service-based integration scheme for transmitting data between the various devices in the electronic transfer network 100. Security and integration components 308 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 308 and/or elsewhere within the electronic data transfer network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 302 and client devices 306. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML encryption. In other examples, the security and integration components 308 may include specialized hardware for providing secure web services. For example, security and integration components 308 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 320 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 320 may be local area networks (LAN), such as one based on Ethernet, Token-Ring and/or the like. Network(s) 320 also may be wide-area networks, such as the Internet. Networks 320 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 320.

Computing environment 300 also may include one or more data stores 310 and/or back-end servers 312. In certain examples, the data stores 310 may correspond to data store server(s) 104 discussed above in FIG. 1, and back-end servers 312 may correspond to the various back-end servers 110-116. Data stores 310 and servers 312 may reside in the same datacenter or may operate at a remote location from server 302. In some cases, one or more data stores 310 may reside on a non-transitory storage medium within the server 302. Other data stores 310 and back-end servers 312 may be remote from server 302 and configured to communicate with server 302 via one or more networks 320. In certain embodiments, data stores 310 and back-end servers 312 may reside in a storage-area network (SAN), or may use a storage-as-a-service (STaaS) architectural model.

Figure 4:
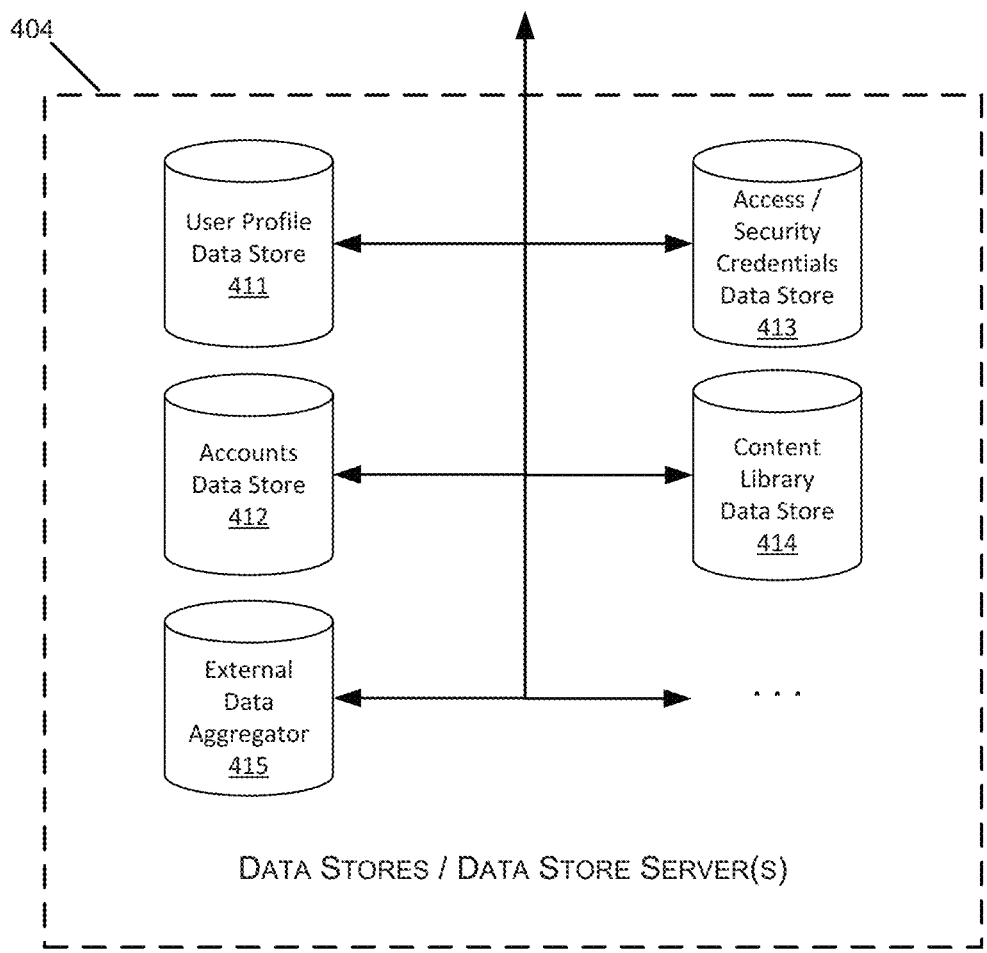
FIG. 4 is a block diagram illustrating an embodiment of one or more data store servers within an electronic data transfer network, according to one or more embodiments of the disclosure.

With reference to FIG. 4, an illustrative set of data stores and/or data store servers is shown, corresponding to the data store servers 104 of the electronic data transfer network 100 discussed above in FIG. 1. One or more individual data stores 411-415 may reside in storage on a single computer server 104 (or a single server farm or cluster) under the control of a single entity, or may reside on separate servers operated by different entities and/or at remote locations. In some embodiments, data stores 411-415 may be accessed by the data management server 102 and/or other devices and servers within the network 100 (e.g., client devices 106, external systems 110, administrator servers 116, etc.). Access to one or more of the data stores 411-415 may be limited or denied based on the processes, user credentials, and/or devices attempting to interact with the data store.

The paragraphs below describe examples of specific data stores that may be implemented within some embodiments of an electronic data transfer network 100. It should be understood that the below descriptions of data stores 411-415, including their functionality and types of data stored therein, are illustrative and non-limiting. Data stores server architecture, design, and the execution of specific data stores 411-415 may depend on the context, size, and functional requirements of an electronic data transfer network 100. For example, in electronic data transfer systems 100 used to provide electronic advertising or other media content from content providers to client devices 106, separate data stores may be implemented in data stores server(s) 104 to store listings of available content and descriptions, content usage statistics, client device profiles, account data, network usage statistics, etc. In electronic data transfer systems 100 used to support transaction systems with client devices, separate data stores may be implemented in data stores server(s) 104 to store transaction data, user data, location data, device interaction data, etc. As another example, for electronic data transfer systems 100 used for educational or professional training client-server systems, separate databases or file-based storage systems may be implemented in data store server(s) 104 to store trainee and/or trainer data, training module data and content descriptions, training results, evaluation data, and the like.

A user profile data store 411 may include information relating to the end users within the electronic data transfer network 100. This information may include user characteristics such as the user names, access credentials (e.g., logins and passwords), user preferences, and information relating to any previous user interactions within the electronic transfer network 100 (e.g., requested data, provided data, system usage data/statistics, associated users, etc.).

An accounts data store 412 may generate and store account data for different users in various roles within the electronic data transfer network 100. For example, accounts may be created in an accounts data store 412 for individual end users, administrator users, and external entities such as businesses, governmental or educational institutions. Account data may include account types, current account status, account characteristics, and any parameters, limits, restrictions associated with the accounts.

A content/security credential data store 413 may include access rights and security information for the electronic data transfer network 100 and specific files/content resources. For example, the content/security credential data store 413 may include login information (e.g., user identifiers, logins, passwords, etc.) that can be verified during login attempts by users and/or client devices 106 to the network 100. The content/security credential data store 413 also may be used to store assigned user roles and/or user levels of access. For example, a user's access level may correspond to the sets of data and/or the client or server applications that the user is permitted to access. Certain users and/or client devices may be permitted or denied access to certain applications and resources based on their access level, subscription level, etc. Certain users and/or client devices 106 may have supervisory access over one or more end users accounts and/or other client devices 106, allowing the supervisor to access all or portions of the user's content access, activities, etc. Additionally, certain users and/or client devices 106 may have administrative access over some users and/or some applications in the electronic data transfer network 100, allowing such users to add and remove user accounts, modify user access permissions, perform maintenance updates on software and servers, etc.

A content library data store 414 may include information describing the individual data items (or resources) available via the electronic data transfer network 100. In some embodiments, the content data store 414 may include metadata, properties, and other characteristics associated with the data items stored in the content server 112. Such data may identify one or more aspects or attributes of the associated data items, for example, subject matter or access level of the content resources, license attributes of the data items (e.g., any limitations and/or restrictions on the licensable use and/or distribution of the data items), price attributes of the data items (e.g., a price and/or price structure for determining a payment amount for use or distribution of the data items), language and geographic associations with the data items, and the like. In some embodiments, the content data store 414 may be configured to allow updating of data item metadata or properties, and to allow the addition and/or removal of information relating to the data items. For example, item relationships may be implemented as graph structures, which may be stored in the content data store 414 or in an additional data store for use by selection algorithms along with the other metadata.

In addition to the illustrative data stores described above, data store server(s) 104 (e.g., database servers, file-based storage servers, etc.) may include one or more external data aggregators 415. External data aggregators 415 may include third-party data sources accessible to the electronic data transfer network 100, but not maintained by the electronic data transfer network 100. External data aggregators 415 may include any electronic information source relating to the users, data items, or applications of the electronic data transfer network 100. For example, external data aggregators 415 may be third-party data stores containing demographic data, education related data, financial data, consumer sales data, health related data, and the like. Illustrative external data aggregators 415 may include, for example, social networking web servers, public records data stores, educational institution servers, business servers, consumer retail sales data stores, medical record data stores, etc. Data retrieved from various external data aggregators 415 may be used to verify and update user account information, suggest or select user content, and perform user and content evaluations. In some cases, external data aggregators 415 may correspond to external servers/systems 110.

Figure 5:
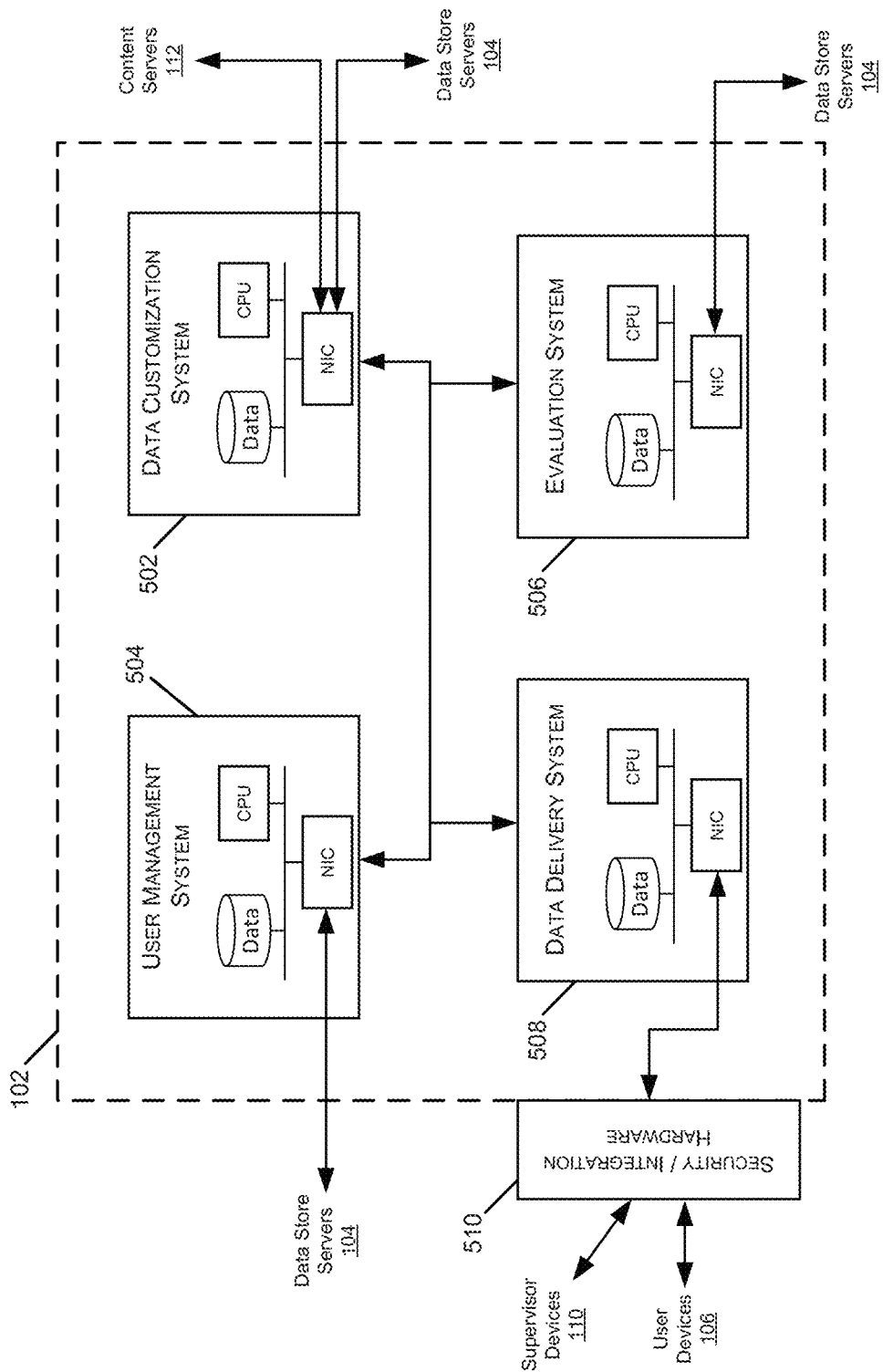
FIG. 5 is a block diagram illustrating an embodiment of one or more content management servers within an electronic data transfer network, according to one or more embodiments of the disclosure.

With reference now to FIG. 5, a block diagram is shown illustrating an embodiment of one or more data management servers 102 within an electronic data transfer network 100. As discussed above, data management server(s) 102 may include various server hardware and software components that manage the content resources within the electronic data transfer network 100 and provide interactive and adaptive content to users on various client devices 106. For example, data management server(s) 102 may provide instructions to and receive information from the other devices within the electronic data transfer network 100, in order to manage and transmit data resources, user data, and server or client applications executing within the network 100.

A data management server 102 may include a data customization system 502. The data customization system 502 may be implemented using dedicated hardware within the electronic data transfer network 100 (e.g., a data customization server 502), or using designated hardware and software resources within a shared data management server 102. In some embodiments, the data customization system 502 may adjust the selection and adaptive capabilities of data resources to match the needs and desires of the users and/or client devices 106 receiving the content. For example, the data customization system 502 may query various data stores and servers 104 to retrieve user information, such as user preferences and characteristics (e.g., from a user profile data store 411), location/geographic information associated with users and/or client devices 106, user access restrictions to data recourses (e.g., from an access credential data store 413), previous user activity within the network 100, and the like. Based on the retrieved information from data stores 104 and other data sources, the data customization system 502 may modify content resources for individual users and/or individual client devices 106.

A data management server 102 also may include a user management system 504. The user management system 504 may be implemented using dedicated hardware within the electronic data transfer network 100 (e.g., a user management server 504), or using designated hardware and software resources within a shared data management server 102. In some embodiments, the user management system 504 may monitor the activities of users and/or user devices 106 with respect to various data resources. For example, the user management system 504 may query one or more databases and/or data store servers 104 to retrieve user data such as associated data resources, access and completion status, results, and the like.

A data management server 102 also may include an evaluation system 506. The evaluation system 506 may be implemented using dedicated hardware within the electronic data transfer network 100 (e.g., an evaluation server 506), or using designated hardware and software resources within a shared data management server 102. The evaluation system 506 may be configured to receive and analyze information from client devices 106. For example, various data received by users via client devices 106 may be compiled and analyzed, and then stored in a data store 104 associated with the user and/or data item. In some embodiments, the evaluation server 506 may analyze the information to determine the effectiveness or appropriateness of data resources with a user or user group, for example, based on subject matter, age group, skill level, or the like. In some embodiments, the evaluation system 506 may provide updates to the data customization system 502 or the user management system 504, with the attributes of one or more data resources or groups of resources within the network 100.

A data management server 102 also may include a data delivery system 508. The data delivery system 508 may be implemented using dedicated hardware within the electronic data transfer network 100 (e.g., a data delivery server 508), or using designated hardware and software resources within a shared data management server 102. The data delivery system 508 may receive data from the data customization system 502 and/or from the user management system 504, and transmit the resources to client devices 106. In some embodiments, the data delivery system 508 may determine the appropriate presentation format for the data resources based on the user characteristics and preferences, and/or the device capabilities of client devices 106. If needed, the data delivery system 508 may convert the content resources to the appropriate presentation format and/or compress the content before transmission. In some embodiments, the data delivery system 508 may also determine the appropriate transmission media and communication protocols for transmission of the data to and from client devices 106.

In some embodiments, the data delivery system 508 may include specialized security and integration hardware 510, along with corresponding software components to implement the appropriate security features for data transmission and storage, to provide the supported network and client access models, and to support the performance and scalability requirements of the network 100. The security and integration layer 510 may include some or all of the security and integration components 308 discussed above in FIG. 3, and may control the transmission of data, as well as the receipt of requests, and data interactions to and from the client devices 106, external servers 110, administrative servers 116, and other devices in the network 100.

Figure 6:
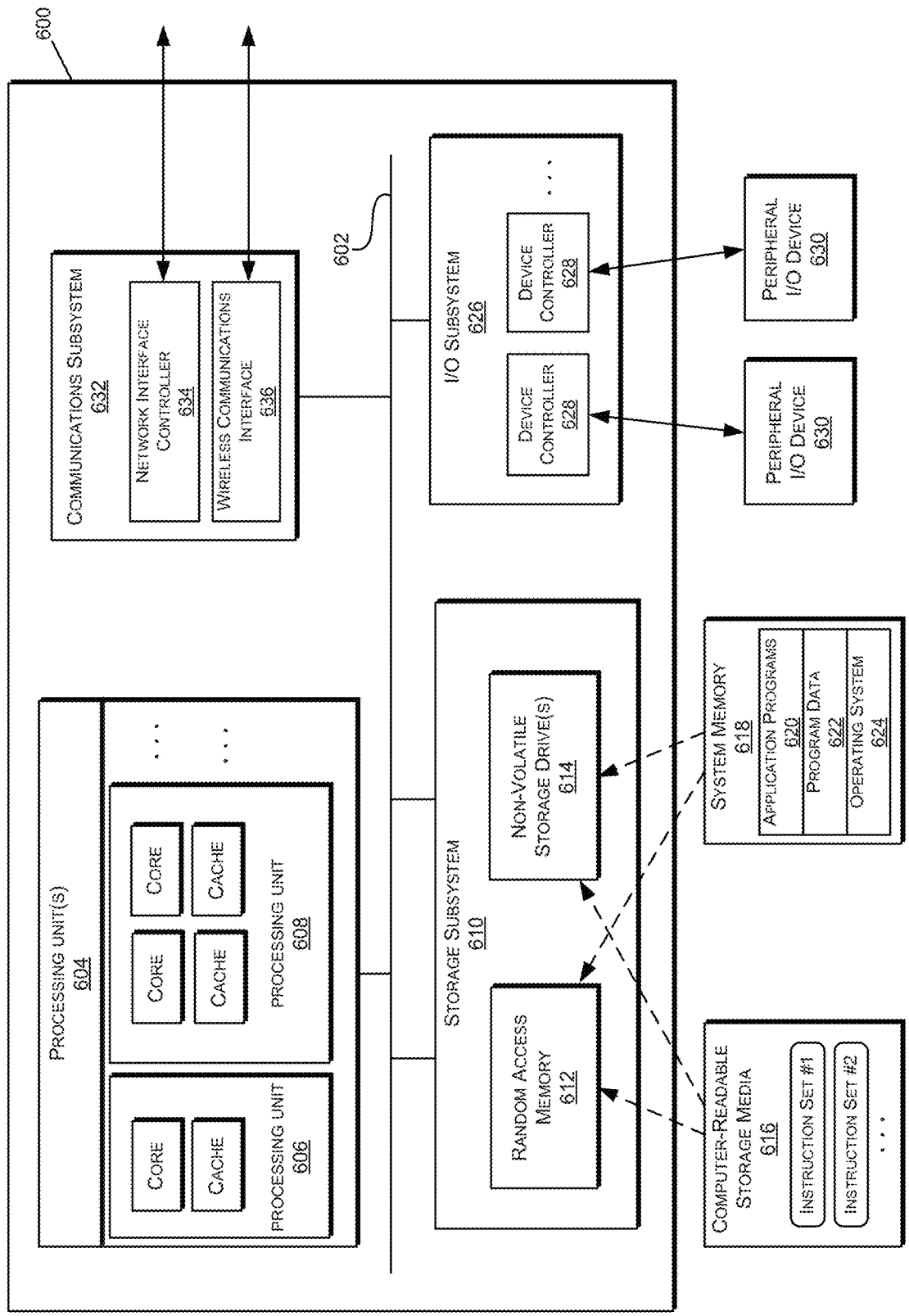
FIG. 6 is a block diagram illustrating the physical and logical components of a special-purpose computing device within an electronic data transfer network, according to one or more embodiments of the disclosure.

With reference now to FIG. 6, a block diagram of an illustrative computer system is shown. The system 600 may correspond to any of the computing devices or servers of the electronic data transfer network 100 described above, or any other computing devices described herein. In this example, computer system 600 includes processing units 604 that communicate with a number of peripheral subsystems via a bus subsystem 602. These peripheral subsystems include, for example, a storage subsystem 610, an I/O subsystem 626, and a communications subsystem 632.

Bus subsystem 602 provides a mechanism for letting the various components and subsystems of computer system 600 communicate with each other as intended. Although bus subsystem 602 is shown schematically as a single bus, alternative embodiments of the bus subsystem may utilize multiple buses. Bus subsystem 602 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 604, which may be implemented as one or more integrated circuits (e.g., a conventional microprocessor or microcontroller), controls the operation of computer system 600. One or more processors, including single core and/or multicore processors, may be included in processing unit 604. As shown in FIG. 6, processing unit 604 may be implemented as one or more independent processing units 606 and/or 608 with single or multicore processors and processor caches included in each processing unit. In other embodiments, processing unit 604 may also be implemented as a quad-core processing unit or larger multicore designs (e.g., hexa-core processors, octo-core processors, ten-core processors, or greater. As discussed above, in some cases, processing unit 604 may include one or more specialized ASICs designed and configured for cryptocurrency mining and/or specialized cryptographic hardware for handling cryptocurrency transactions.

Processing unit 604 may execute a variety of software processes embodied in program code, and may maintain multiple concurrently executing programs or processes. At any given time, some or all of the program code to be executed can be resident in processor(s) 604 and/or in storage subsystem 610. In some embodiments, computer system 600 may include one or more specialized processors, such as digital signal processors (DSPs), outboard processors, graphics processors, application-specific processors, and/or the like.

I/O subsystem 626 may include device controllers 628 for one or more user interface input devices and/or user interface output devices 630. User interface input and output devices 630 may be integral with the computer system 600 (e.g., integrated audio/video systems, and/or touchscreen displays), or may be separate peripheral devices which are attachable/detachable from the computer system 600.

Input devices 630 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 630 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 630 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 630 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 600 to a user or other computer. For example, output devices 630 may include, without limitation, a variety of display devices that visually convey text, graphics and audio/video information such as monitors, printers, speakers, headphones, automotive navigation systems, plotters, voice output devices, and modems.

Computer system 600 may comprise one or more storage subsystems 610, comprising hardware and software components used for storing data and program instructions, such as system memory 618 and computer-readable storage media 616. The system memory 618 and/or computer-readable storage media 616 may store program instructions that are loadable and executable on processing units 604, as well as data generated during the execution of these programs.

Depending on the configuration and type of computer system 600, system memory 618 may be stored in volatile memory (such as random access memory (RAM) 612) and/or in non-volatile storage drives 614 (such as read-only memory (ROM), flash memory, etc.) The RAM 612 may contain data and/or program modules that are immediately accessible to and/or presently being operated and executed by processing units 604. In some implementations, system memory 618 may include multiple different types of memory, such as static random access memory (SRAM) or dynamic random access memory (DRAM). In some implementations, a basic input/output system (BIOS), containing the basic routines that help to transfer information between elements within computer system 600, such as during start-up, may typically be stored in the non-volatile storage drives 614. By way of example, and not limitation, system memory 618 may include application programs 620, such as client applications, Web browsers, mid-tier applications, server applications, etc., program data 622, and an operating system 624.

Storage subsystem 610 also may provide one or more tangible computer-readable storage media 616 for storing the basic programming and data constructs that provide the functionality of some embodiments. Software (programs, code modules, instructions) that when executed by a processor provide the functionality described herein may be stored in storage subsystem 610. These software modules or instructions may be executed by processing units 604. Storage subsystem 610 may also provide a repository for storing data used in accordance with the present invention.

Storage subsystem 610 may also include a computer-readable storage media reader that can further be connected to computer-readable storage media 616. Together and, optionally, in combination with system memory 618, computer-readable storage media 616 may comprehensively represent remote, local, fixed, and/or removable storage devices plus storage media for temporarily and/or more permanently containing, storing, transmitting, and retrieving computer-readable information.

Computer-readable storage media 616 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 600.

By way of example, computer-readable storage media 616 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 616 may include, but is not limited to, Zip® drives, flash memory cards, universal serial bus (USB) flash drives, secure digital (SD) cards, DVD disks, digital video tape, and the like. Computer-readable storage media 616 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 600.

Communications subsystem 632 may provide a communication interface from computer system 600 and external computing devices via one or more communication networks, including local area networks (LANs), wide area networks (WANs) (e.g., the Internet), and various wireless telecommunications networks. The communications subsystem 632 may include, for example, one or more network interface controllers (NICs) 634, such as Ethernet cards, Asynchronous Transfer Mode NICs, Token Ring NICs, and the like, as well as one or more wireless communications interfaces 636, such as wireless network interface controllers (WNICs), wireless network adapters, and the like. Additionally and/or alternatively, the communications subsystem 632 may include one or more modems (telephone, satellite, cable, ISDN), synchronous or asynchronous digital subscriber line (DSL) units, FireWire® interfaces, USB® interfaces, and the like. Communications subsystem 636 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 632 may be detachable components coupled to the computer system 600 via a computer network, a FireWire® bus, or the like, and/or may be physically integrated onto a motherboard of the computer system 600. Communications subsystem 632 also may be implemented in whole or in part by software.

In some embodiments, communications subsystem 632 may also receive input communication in the form of structured and/or unstructured data feeds, event streams, event updates, and the like, on behalf of one or more users who may use or access computer system 600. For example, communications subsystem 632 may be configured to receive data feeds in real-time from users of social networks and/or other communication services, web feeds such as Rich Site Summary (RSS) feeds, and/or real-time updates from one or more third party information sources (e.g., data aggregators 309). Additionally, communications subsystem 632 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 632 may output such structured and/or unstructured data feeds, event streams, event updates, and the like to one or more data stores 104 that may be in communication with one or more streaming data source computers coupled to computer system 600.

Due to the ever-changing nature of computers and networks, the description of computer system 600 depicted in FIG. 6 is intended only as a specific example. Many other configurations having more or fewer components than the system depicted in FIG. 6 are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 7:
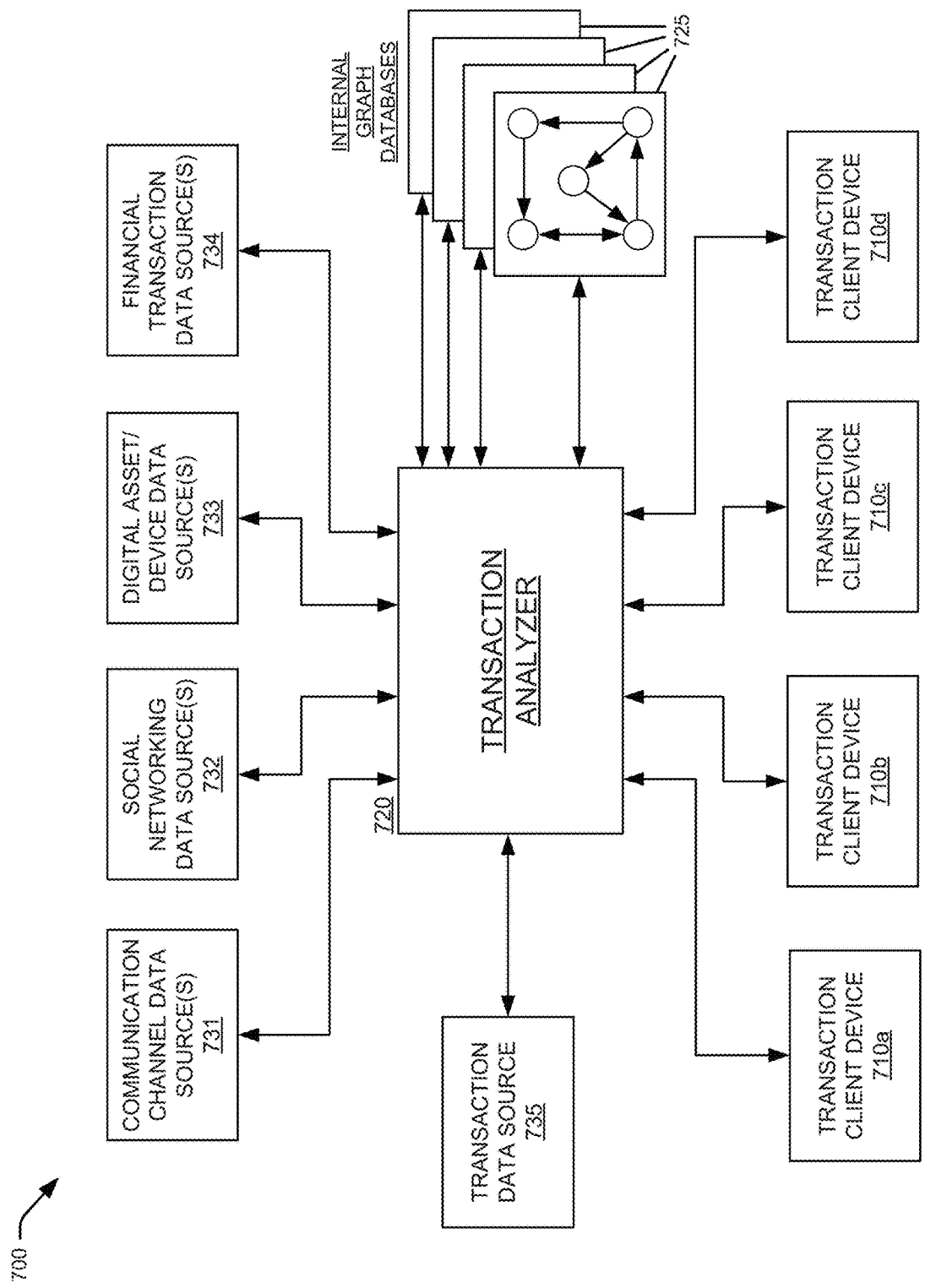
FIG. 7 is a block diagram illustrating an example transaction analysis and processing system including a transaction analyzer, a plurality of data source devices, and a plurality of transaction client devices, according to one or more embodiments of the disclosure.

With reference now to FIG. 7, a block diagram is shown illustrating an example transaction analysis and processing system 700 including a transaction analyzer 720, a plurality of data sources 731-735, and a plurality of transaction client devices 710a-710d (which collectively and/or individually may be referred to as client device(s) 710). As discussed below in more detail, transaction analyzer 720 may include a number of subsystems (e.g., servers, processing engines, applications, etc.) configured to receive and analyze transaction data from various data sources 731-735, generate and store graph-oriented data structures 725 based on the transaction data, and use the graph-oriented data structures 725 to analyze and process transactions initiated by client devices 710 at various locations using various access channels.

As noted above, transaction analyzer 720 may receive transaction data from one or more data sources, and then analyze, aggregate, and use the transaction data to generate graph-oriented data structures 725 based on the transaction data. Each data source 731-735 may provide transaction data to the transaction analyzer 720, the transaction data including, for example, data corresponding to a set of single-user transactions, multi-user transactions, and/or interactions/communications between different users. The transaction data provided by the data sources 731-735 may include data identifying particular users, the types or characteristics of particular transactions or user interactions, transaction times, client devices used for transactions, communication networks and channels used for transactions, etc. Although five data sources 731-735 are shown in this example, it should be understood that in other implementations a transaction analyzer 720 may receive data from a single data source only, or a combination of data sources 731-735 and/or other types of transaction data sources.

Data sources 731 may include data stores, servers, and other systems of communication channels. For example, data sources 731 may include email servers, messaging servers, telephone/telecommunication servers, video conferencing servers, network monitors, and the like. These various data sources 731 may be configured to detect and store communications and communication attempts between particular users. The transaction data transmitted by data sources 731 thus may include the users (e.g., sender(s) and receiver(s)) of an email, message, voice, or video communication, the types of devices and specific device identifiers used to send/receive data, communication times, networks and/or the particular communication channels.

Communication channels, in the context of transaction data, may refer to the types of devices, client software applications and/or network infrastructures, used to perform a transaction or in an interaction with one or more other users/devices/systems. For instance, a particular mobile application executing on a user's device 160 may represent a first communication channel, a particular website providing transaction capabilities may represent a second communication channel, a secure embedded application portal executing within a different website or application may represent a third communication channel, a specialized client terminal (e.g., kiosk device) having specialized hardware, software, and networking functionality may represent a fourth communication channel, and so on.

Data sources 732 may include data stores, devices, servers, and the like associated with social networking systems. Thus, the transaction data collected by data sources 732 and provided to transaction analyzer 720 may include the usage data of users at a social networking platform (e.g., users, login session times and durations, client devices, communication channels, geographic regions, etc.) and the corresponding actions or interactions performed via a social network or platform (e.g., the contents of user posts, images or other media uploaded, etc.), and multi-user interactions (e.g., messages sent/received via the social networking system, user-to-user posts or image tagging, etc.).

Data sources 733 may include various devices, servers, client terminals (e.g., digital kiosk systems, etc.) configured to collect transmit device and digital asset data to the transaction analyzer 720. Data sources 733 may include, for example, the individual mobile devices of users, wearable or vehicle-based devices, digital kiosk systems, client terminal, or network devices (e.g., routers, receivers, switches, network monitors, etc.) associated with particular residential or commercial locations. The transaction data collected by data sources 733 and provided to transaction analyzer 720 may include data identifying particular users that were using (or were in the proximity of) particular devices at particular times. Such data also may include the geographic locations of the devices (and thus the users) at such times, as well as the characteristics and capabilities of such devices, the network access of such devices, and the operations performed by the users on the client devices.

Data sources 734 may include data stores, devices, servers, and the like associated with financial transaction systems. Thus, the transaction data collected by data sources 734 and provided to transaction analyzer 720 may include the systems usage data associated with different users via the financial transaction system (e.g., users, login session times and durations, client devices, the times/locations of in-person visits at financial institutions, etc.), and the corresponding financial transactions performed by users (e.g., individual and multi-user financial transactions). Such transaction data may also include the communication channels used for various actions or interactions performed via the financial transaction system or network (e.g., the client devices, applications, and networks used, etc.).

Finally, data source 735 may include data stores, devices, servers, and the like, configured to previous transaction data associated with transaction analyzer system 720. For example, after analyzing a processing a transaction, the transaction analyzer 720 may forward data representing the processed transaction to data source 735 for storage. Thus, the data received from data source 735 may be similar or identical to the data received from other data sources (e.g., users, transactions, transaction times, transaction devices, communication channels, etc.), but may be specifically limited to transactions processed by the same system operating the transaction analyzer 720. Further, in some embodiments, an isolated transaction system 700 may be implemented including only a single data source 735 based on its own previous transactions. Thus, data sources 731-734, and/or any other external data sources, need not be used in such embodiments, and the transaction analyzer 720 may generate graph data structures 725 and process transactions from client devices 710 based solely on its own previous transaction data history.

Each of the data sources 731-735, as well as other data sources used in other examples, may be implemented using specialized hardware and/or software resources configured to collect and transmit transaction data to one or more transaction analyzers 720. In some embodiments, data sources 731-735 may be configured to monitor the activities of users and/or client devices within their respective networks and systems. The transaction analyzer 720 may periodically query one or more data store servers 731-735 to retrieve transaction data, and/or may receive transaction data in the form of structured and/or unstructured data feeds, event streams, event updates, and the like. For example, transaction analyzer 720 may be configured to receive data feeds in real-time from users of social networks 732 and/or other communication services 731, web feeds such as Rich Site Summary (RSS) feeds, and/or real-time updates from one or more third party information sources. Additionally, transaction analyzer 720 may configured to receive data in the form of continuous data streams, which may include event streams of real-time events and/or event updates (e.g., sensor data applications, financial tickers, communication network monitoring tools, clickstream analysis tools, etc.), from various data sources 731-735.

The transaction analyzer 720 may be implemented on a single computer server or a multiple different servers in collaboration, operating at one or more data centers/physical locations. In some embodiments, various client-facing components (e.g., hardware or software servers, services, etc.) may be implemented to interface with the various client devices 710 and/or data sources 731-735. For example, the transaction analyzer 720 may include a mobile application server 721 in some embodiments, used to communicate with multiple mobile devices 710 via mobile communication networks 717. The transaction analyzer 720 also may include an application web server and additional network interface components to interface with different client devices 710 operating at different locations. Additionally, the transaction analyzer 720 in this example may include one or more back-end servers and/or processing engines configured perform the processes and other underlying functionality described below in more detail. For instance, a transaction analyzer 720 may include specialized hardware and/or software components used to generate and store the large scale graph-oriented data structures 725 used to represent the transaction data received from data sources 731-735 (e.g., cloud-based and/or big data storage and analytics tools). Additionally or alternatively, the transaction analyzer 720 may include specialized hardware and/or software components used to analyze the graph-oriented data structures 725 during transaction evaluation and processing (e.g., graph algorithms for traversing data structures 725, distributed and/or shared-memory graph processing tools, graph query programming language tools, etc.). Although all of these components and functions may be implemented in a single transaction analyzer 720, as shown in this example, it should be understood that these components and corresponding functions may be implemented and performed in multiple different systems 720 in other examples. For instance, a first system (or set of systems) operated by one entity may interface with data sources 731-735 to analyze transaction data and generate/maintain the graph-oriented data structures 725, while a second system (or set of systems) operated by one entity may interface with clients 710 to receive and process individual transactions, and so on.

The graph-oriented data structures 725 themselves may be generated and stored within the systems of the transaction analyzer 720, or on separate storage systems and devices. As discussed below in more detail, graph-oriented data structures 725 may store data graphically representing a plurality of transactions, including all transaction-related entities (e.g., users, devices, transaction types, locations, channels, etc.) and transaction properties (e.g., times, types, amounts, etc.). In contrast to relational data storage systems, the graph-oriented data structures 725 (or graph data structures) may store data as a series of nodes representing entities, edges representing relationships/connections between entities, and properties that may be associated with nodes and/or edges. In some embodiments, graph-oriented data structures 725 may be implemented using key-value data stores and/or semi-structured data (e.g., XML databases and other document-oriented data stores). Such data structures 725 may be non-relational and/or NOSQL data structures, supported by NOSQL graph databases and corresponding query languages and tools. In other embodiments, graph-oriented data structures 725 may be implemented using a relational database engine with the graph data stored in tables.

As discussed below in more detail, different numbers of graph-oriented data structures 725 may be generated in different embodiments, and different entities may be used to represent nodes, edges, and properties. For example, in certain embodiments, the transaction analyzer 720 may generate and maintain a single graph-oriented data structure 725 that includes every piece of transaction data received from all data sources 731-735. In other cases, individual graph-oriented data structures 725 may be generated for subsets of the transaction data, for example, different graph-oriented data structures may be generated to represent the different subsets of transaction data received from different data sources 731-735. As another example, different graph-oriented data structures may be generated to represent particular users (e.g., a first user and all related transactions/devices/networks/channels/other users), or particular subsets of users (e.g., a pair of particular users and their related entities, etc.). Thus, when multiple graph-oriented data structures 725 are generated and maintained, different data views and relationships may be represented, and these data structures may include overlapping data which should remain in sync.

As discussed below, transaction client devices 710 may communicate with the transaction analyzer 720 to request, initiate, and/or complete transactions. For instance, certain end-to-end transactions may be entirely completed at a single time by an authorized user via a client device 710 in communication with the transaction analyzer 720, while other transactions may involve multiple discreet interactions between the transaction analyzer 720 and multiple users at different client devices 720 at different times. For example, a first user at a first client device 710*a* may transmit a transaction request involving multiple parties to the transaction analyzer 720, which may review and analyze the transaction request, and initially approve/deny/hold the transaction. In this example, if the transaction is approved or held by the transaction analyzer 720, then a second user at a second client device 710*b* may subsequently communicate with the transaction analyzer 720 to attempt to update or complete the transaction, at which time the transaction analyzer 720 may once again review and analyze the updated transaction based on the updated data from the second user to approve/deny/hold the updated transaction. In other examples, multi-party transactions may require user communication sessions and/or data from three or more different users via different client devices 710

Transaction client devices 710 may include any types of computing devices discussed above in connection with user devices 106, 206, 600, etc. For example, one or more transaction client devices 710 may include desktop computers, servers, television set-top boxes, and home gaming systems, while other client devices 710 may include various mobile devices such as laptop computers, tablet computers, smart phones, smart watches, wearable computing devices, and vehicle-based computing systems. Each client device 710 may include some or all of the components of device 600, discussed above. However, it should be understood that these examples of user device architectures are illustrative and non-limiting, and that different configurations of hardware, software, and network components may be used in different user devices 1610

Various transaction client devices 710 and/or data sources 731-735 may communicate with the transaction analyzer 720 via one or more different communication networks. For example, mobile client devices 710, digital kiosk system clients 710, and/or client computers 710 may communicate directly with the transaction analyzer 720, while other such devices 710 may communicate with the transaction analyzer 720 indirectly via one or more intermediary network components (e.g., routers, gateways, firewalls, etc.) or other intermediary devices (e.g., data management servers 102, content servers 112, etc.). Although the physical network components have not been shown in FIG. 7 so as not to obscure the other elements depicted, it should be understood that any of the network hardware components and network architecture designs may be implemented in various embodiments to support communication between the servers and devices in the system 700. Additionally, different client devices 710 and different data sources 7310735 may use different networks and networks types to communicate with each other and/or with the transaction analyzer 720, including one or more telecommunications networks, cable networks, satellite networks, cellular networks and other wireless networks, and computer-based IP networks, and the like. Further, certain components within transaction system 700 may include special purpose hardware devices and/or special purpose software, such as those included in I/O subsystems systems, positioning systems, and storage and networking capabilities of the various client devices 710, as well as those within the processing engines, subcomponents, and data stores of the transaction analyzer 720.

In some embodiments, transaction systems 700 may be integrated within, or configured to operate in collaboration with, one or more electronic data transfer networks 100. For example, system 700 may be the same as, or may operate within or in collaboration with, any of the electronic data transfer network 100 described above. Thus, specific examples of transaction systems 700 may include, without limitation, secure systems for transferring value and other media of exchange, eCommerce systems, multi-entity systems for exchanging content resources (e.g., media files, educational and professional training content, gaming content, Internet content, etc.), and other electronic data transfer systems. In such cases, the transaction analyzer 720 and its associated components, subsystems, and data stores may correspond to and may be implemented within a data management server 102 and/or a data store server 104, and client devices 710 and data sources 731-735 may correspond to the client devices and/or external systems described above in reference to network 100.

Figure 8:
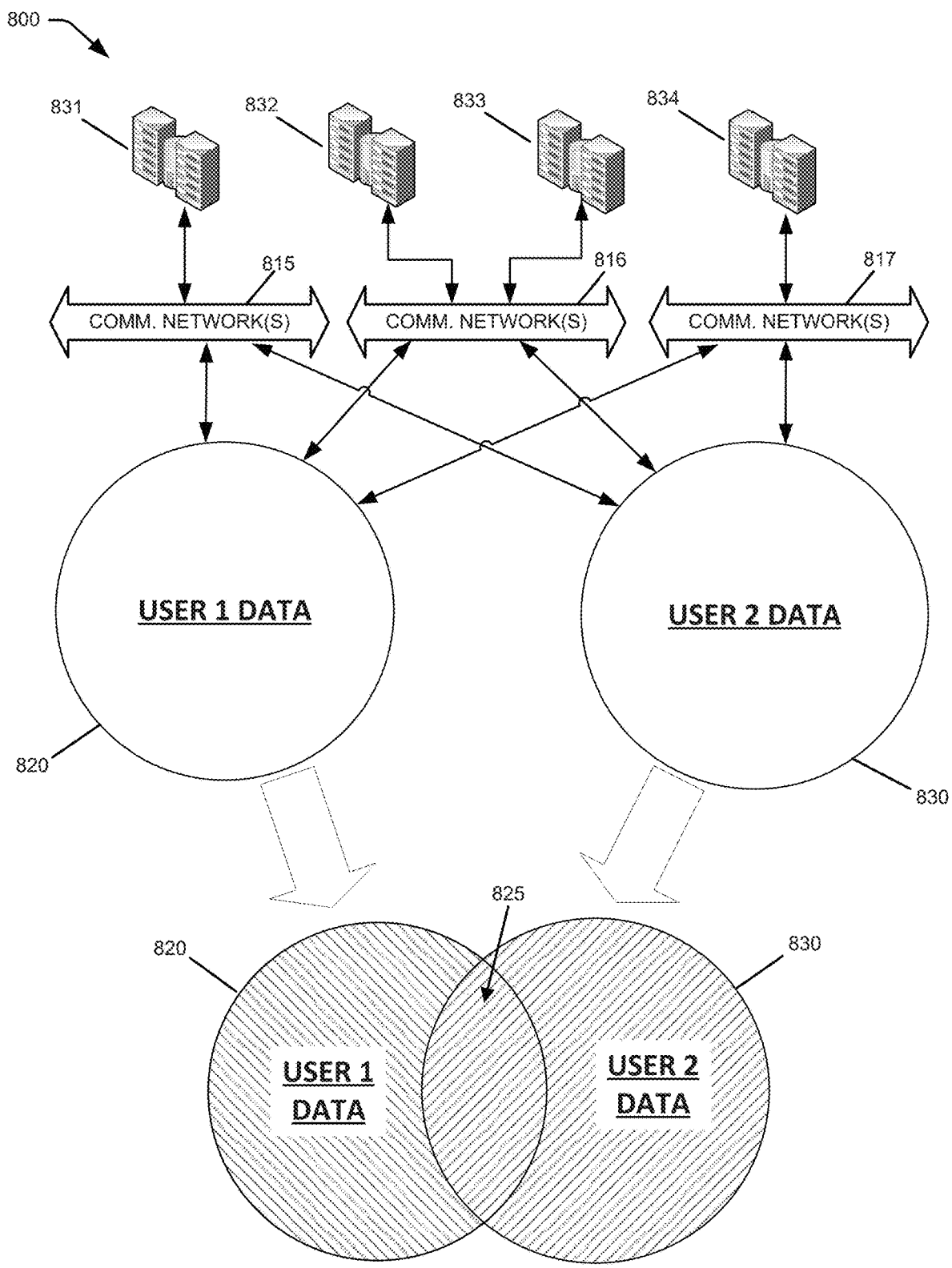
FIG. 8 includes an example data flow diagram and a Venn diagram illustrating a plurality of data representing a set of transactions and/or interactions associated with a specific pair of users, according to one or more embodiments of the disclosure.

Referring now to FIG. 8, a diagram is shown illustrating an example data flow and a Venn diagram representing a set of transaction data associated with a particular user pair. As discussed below, the diagrams shown in this example may illustrate the aggregation and filtering of various transaction data from multiple different data sources 831-834, into a transaction data subset associated with a particular user-pair. Although these features are described in reference to the transaction systems described above (e.g., system 700), it should be understood that the various features described herein need not be limited to the specific systems and hardware implementations described above in FIGS. 1-7.

Initially, data flow diagram 800 includes a set of data source servers 831-834 configured to independently transmit transaction data through communication networks 815-817, to a transaction analyzer server (not shown). In some embodiments, data source servers 831-834 may correspond to data sources 731-735, discussed above. For example, data source servers 831-834 may include one or more computer servers associated with: a communication system (e.g., email servers, messaging servers, telephone servers, video conferencing servers, network monitors, etc.), a social networking system, an eCommerce system, a secure data transfer system, a media content distribution system, a financial transaction system, etc. As noted above, in some embodiments, the processes and techniques described herein may be performed based on data from a single data source only, while in other examples data from multiple different data sources may be used. Additionally, the communication channel data identifying the means by which the users interacted with the data source systems 831-834 also may be collected and transmitted to the transaction analyzer 720. Such communication channel data may indicate, for example, if a user accessed a particular data source (e.g., a social networking platform, financial transaction system, email server, etc.) via a mobile device and standalone mobile application, via a web browser, via a public specialized kiosk/terminal system, via an in-person visit to an agent-assisted facility, and the like. Communication channel data also may indicate which geographic regions, networks, client devices, and the like, were used to access the particular data source systems by users at different times and for different transactions.

In this example, data flow diagram 800 illustrates that data may be retrieved from data source servers 831-834 through multiple different communication networks 815-817. As discussed above, communication networks 815-817 may include \one or more telecommunications networks, cable networks, satellite networks, cellular networks and other wireless networks, and computer-based IP networks, and the like.

The remaining portions of diagram 800 are illustrative of steps that may be performed by a transaction analyzer 720 or other computer server in certain embodiments. For example, the transaction analyzer 720 may receive a plurality of transmissions of transaction data from one or more data source servers 831-834, and may extract (e.g., using filters, queries, streaming analytics, etc.) different subsets of transaction data relating to individual users. In this case, a first transaction data subset 820 may include any data received from all data source servers 831-834, including all different communication channels, for transactions involving or relating to User 1. Similarly, data subset 830 in this example may include all data transactions involving or relating to User 2. For instance, for transaction data received from a communication server 831 (e.g., email server, telephone call data center, etc.), the transaction analyzer 720 may separate and aggregate data relating to any communications initiated by User 1, or to which User 1 was an intended recipient, into data subset 820. As another example, for transaction data received from a social networking server 832, the transaction analyzer 720 may separate and aggregate data relating to all social networking activities performed by User 1 (e.g., login data, posts, image uploads, messages sent, comments or likes, etc.) into data subset 820. In this example, the transaction analyzer 720 also may aggregate all social networking activities performed by other users that relate to User 1 (e.g., messages or posts directed to or mentioning User 1, tags of User 1 in images or at locations, other posted content mentioning User 1, views or responses to activities of User 1, etc.), and may collect this additional data into the data subset 820 as well. Similarly, for transaction data received from a data source server 832 associated with a financial transaction system, an eCommerce system, a secure data transfer system etc., the transaction analyzer 720 may separate and aggregate data relating to all transactions associated with User 1 (e.g., requested by User 1, directed to User 1, listing User 1 as a party, requiring approval by User 1, etc.) into the data subset 820. It should be understood that these examples are illustrative only, and in various embodiments the different subsets of transaction data relating to individual users may be determined based on any relevant criteria and from any selected data sources 831-834.

Finally, diagram 800 illustrates a Venn diagram that combines the first transaction data subset 820 involving or relating to User 1 with the second transaction data subset 830 involving or relating to User 2. The overlapping portion 825 of the Venn diagram thus represents the subset of data received from all data source servers 831-834, including all different communication channels, for transactions involving or relating to User 1 and User 2. Thus, data subset 825 may include, for example, transaction data identifying all communications or attempted communications between User 1 and User 2 (e.g., emails, telephone calls, application messages, peer-to-peer communications on mobile devices, etc.), all financial transactions, secure data transfers, or other transactions requested and/or completed between User 1 and User 2 (e.g., money/value transfers, media file transfers, eCommerce transactions, governmental or educational records involving both user, etc.), all social networking interactions and overlapping content (e.g., all messages or interactions between users, all occasions of one user mentioning or referencing the other, both users tagged in a media or at a location, both users mentioned in posts, etc.), and the like. Further, in some embodiments, the overlapping data subset 825 may include data indicating any and all overlaps between the individual user data for User 1 and User 2 with respect to location data, time data, device data, etc. For instance, if the data from a digital asset/device data sources 733 indicates that User 1 and User 2 used the same computing device at or about the same time, were in the same location at the same time, etc., then the data representing these user-device or user-location individual relationships may be used to identify overlapping behaviors between pairs of users that may be stored as transaction data in the overlapping data subset 825.

Figure 9:
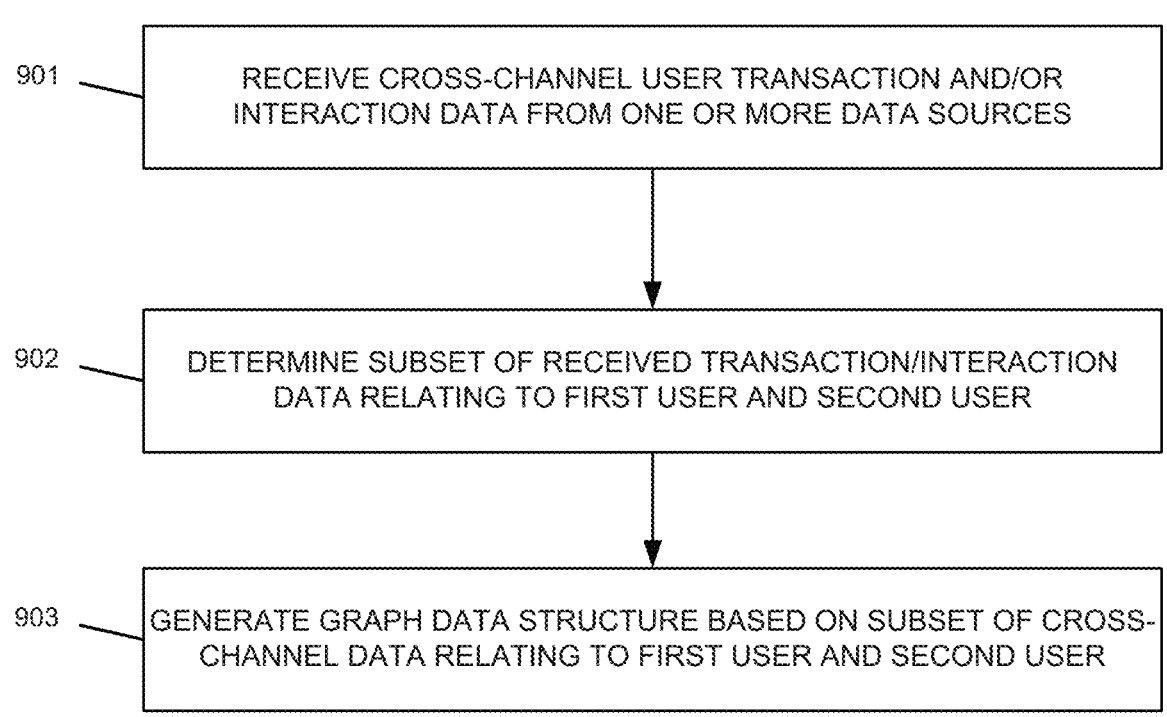
FIG. 9 is a flow diagram illustrating an example process of generating graph-oriented data structures based on subsets of cross-channel user transaction and/or interaction data, according to one or more embodiments of the disclosure.

Referring now to FIG. 9, a flow diagram is shown illustrating an example process of generating graph-oriented data structures based on subsets of cross-channel user transaction and/or interaction data. As described below, the steps in this process may be performed by one or more components in the transaction systems described above (e.g., system 700), such as a transaction analyzer 720 in communication with one or more data sources 731-735. However, it should be understood that the various features and processes described herein, including receiving and analyzing transaction data, determining transaction data subsets, and generating graph-oriented data structures, need not be limited to the specific systems and hardware implementations described above in FIGS. 1-7.

In step 901, a transaction analyzer 720 may receive a plurality of transaction data from one or more data sources 731-735, and in step 902, the transaction analyzer 720 may determine a subset of the received transaction data associated with a particular user pair. Thus, steps 901 and 902 may involve similar or identical techniques to those discussed above in reference to diagram 800, in which overlap region 825 corresponds to the user pair transaction data. As noted above, in some embodiments, the data received in step 901 and separated/partitioned in step 902 may include transaction data from a single data source only. For example, graph-oriented data structures corresponding to user-pairs and other entity combinations may be generated based on data from a communication system 731 only, or from a social networking system 732 only, or from a financial transaction system 734 only, and so on. In other examples, data from multiple sources 731-735 may be received and separated/partitioned in steps 901-902 to be used for graph-oriented data structures. Additionally, as noted above, the transaction data received and separated/partitioned in steps 901-902 may include cross-channel data relating to a set of transactions that involve and/or relate to a particular pair of users. For instance, the data received and separated/partitioned in steps 901-902 may include transaction data relating to the particular pair of users, in which the users interacted with the systems at different times via a website, mobile application, specialized kiosk, and/or in-person agent-assisted transaction location, and at various different geographic locations through various different networks.

In step 903, the transaction analyzer 720 may generate one or more graph-oriented data structures based on the user pair transaction data determined in step 902. In some embodiments, the transaction analyzer 720 may use big data technologies (e.g., big data storage and analytics tools) and/or graph database technologies (e.g., graph algorithms, graph processing tools, graph query programming language tools, etc.) to generate the graph-oriented data structures 725 based on the transaction data subset 825. For example, the transaction analyzer 720 may automatically define or may receiving user input defining which transaction-related entities (e.g., users, devices, transactions, communication channels, data sources, etc.) may be represented as nodes in the graph data structure, as opposed to the other transaction-related entities that may be used to determine edges connecting nodes, and/or other transaction-related entities that may be stored as properties of nodes and/or edges.

Figure 10:
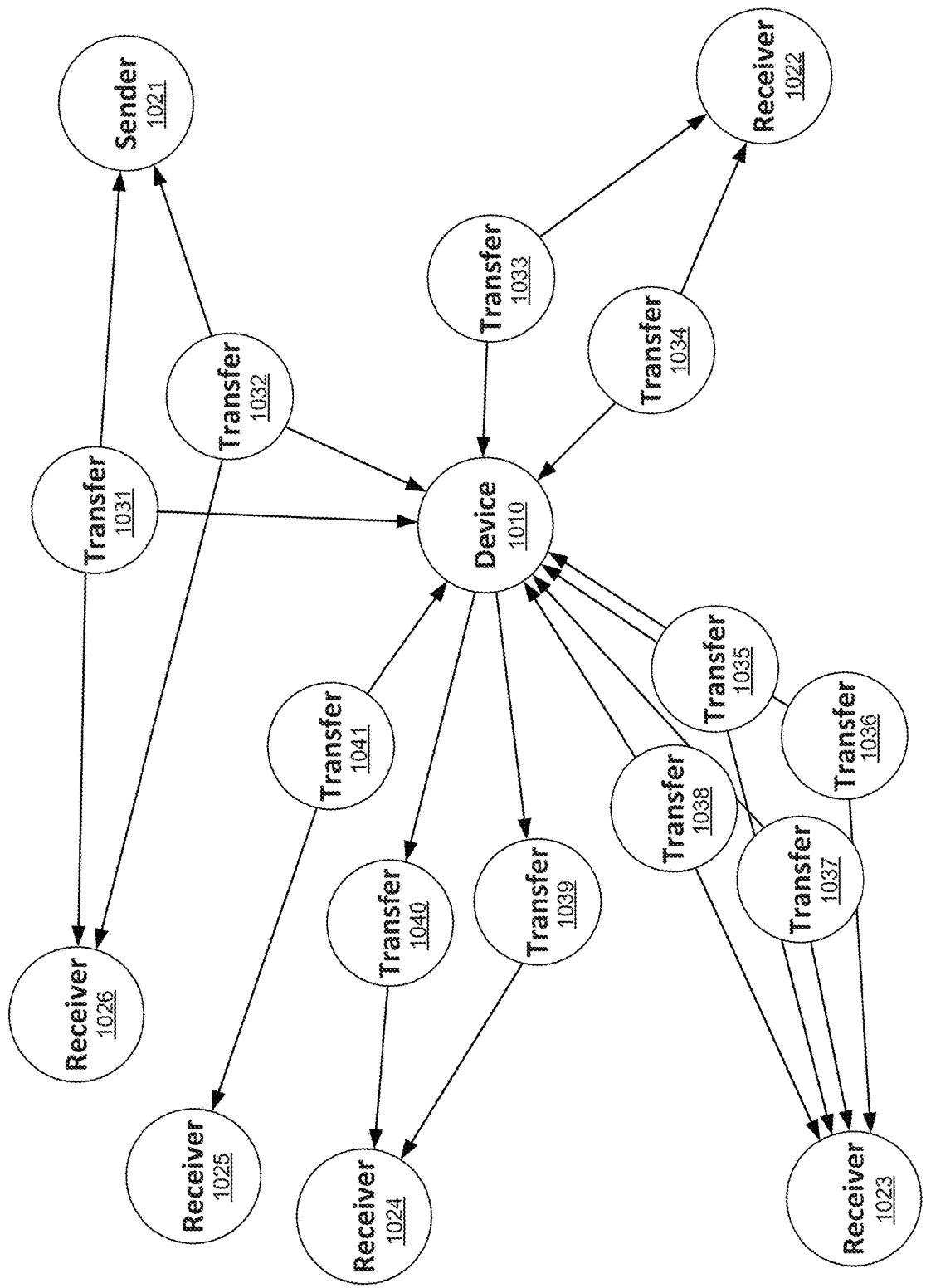
FIG. 10 is an example graph-oriented data structure including graphical data representing a device and a plurality of related users and transfers, according to one or more embodiments of the disclosure.

Referring briefly to FIG. 10, an example graph-oriented data structure is shown representing a plurality of transactions (e.g., secure data transfers) associated with a single sender entity 1021. In this example, 11 separate data transfers (1131-1141) are represented graphically, each data transfer having the same sender entity 1021 and each being initiated by the same client device 1010. 5 different recipient entities (1022-1026) are shown as being associated with one or more of the data transfer transactions. The unidirectional arrows shown in this example are the edges of the graph-oriented data structure, and represent the relationships between the node entities (e.g., Transfer Node→Received by→Receiver Node, Transfer Node→Initiated From →Device Node, and Transfer Node→Sender Name→Sender Node, etc.). Additionally, although not shown in this example, each of the nodes and/or the edges in the graph-oriented data structure may have one or more associated properties to further describe the entity (e.g., user, device, transaction type, etc.) and/or the relationship between entities (e.g., communication channels, networks, times, etc.).

The graph data structure shown in this example represents only a small set of transactions associated with the same sender entity 1021 and client device 1010. Other examples supported herein may include many more complex representations of transaction data, including scenarios with large numbers of nodes, transactions, devices, data sources, communication channels, and the like. As discussed above, in some embodiments the transaction analyzer 720 may generate and maintain a single large graph-oriented data structure 725 in step 903, such that the single graph data structure includes data representing all transaction data received by the transaction analyzer 720 from data sources 731-735 in one large graph landscape. However, in other embodiments, the transaction analyzer 720 may generate and maintain a number of smaller scale graph-oriented data structures 725. Smaller scale graph data structures 725 may be used to store particular subsets of the transaction data, for example, the subset of the transaction data associated with one or more particular users, one or more particular devices, one or more particular data sources, one or more particular transaction types, one or more time periods, and/or one or more particular communication channels. For instance, the graph data structure shown in FIG. 10 may represents a subset of transaction data associated with a single user, such as the User 1 subset of data 820 discussed above. Thus, a different graph-oriented data structure 725 may be used to store a different subset of transaction data corresponding to a particular pair of users (e.g., subset 825 associated with User 1 and User 2). In still other examples, graph-oriented data structures 725 may be used to store the subset of transaction data associated a particular client device (e.g., 1010), or a particular pair of devices, a particular user-device combination, a particular user-data source combination, a particular user-device-communication channel combination, and so on.

Figure 11:
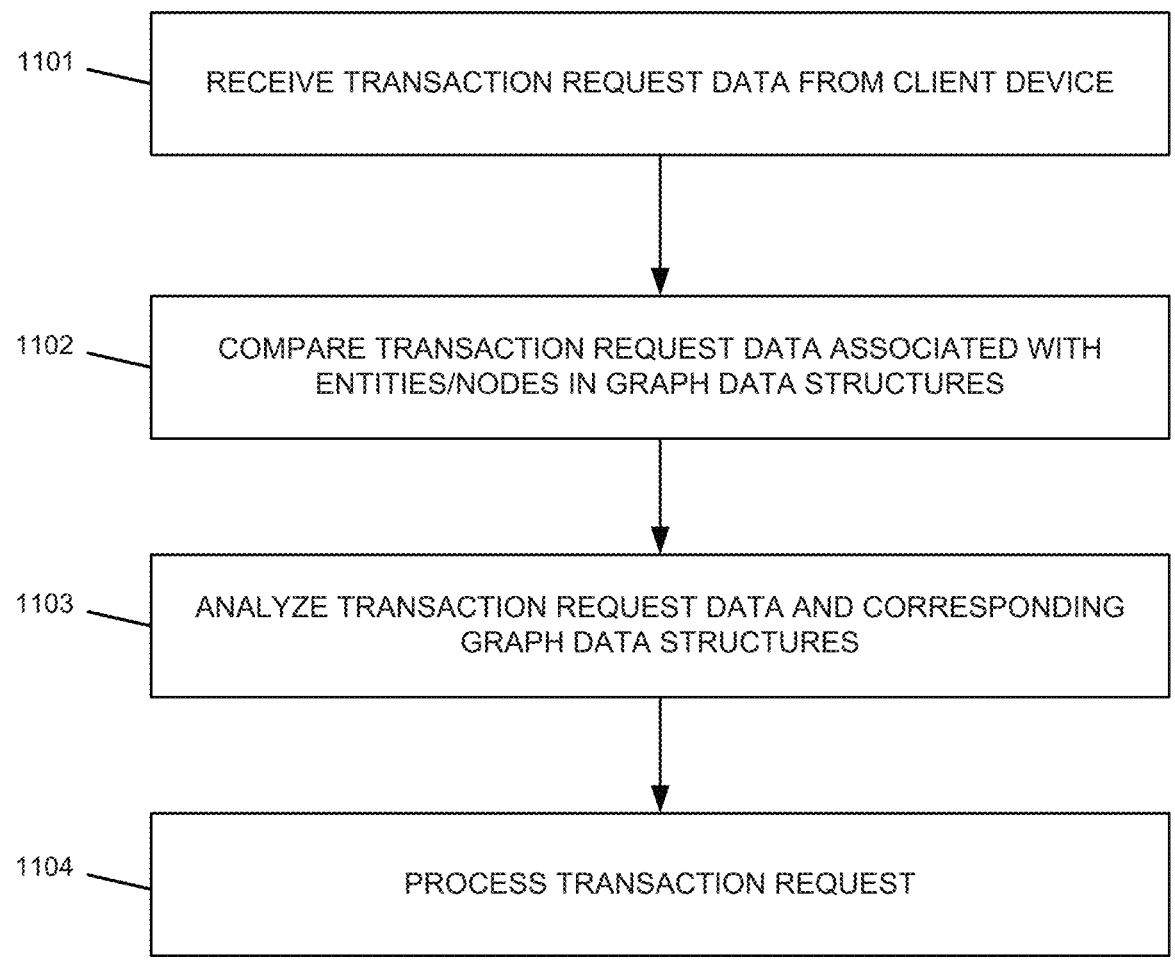
FIG. 11 is a flow diagram illustrating an example process of using graph-oriented data structures to analyze and process a transaction request, according to one or more embodiments of the disclosure.

Referring now to FIG. 11, another flow diagram is shown illustrating an example process of using graph-oriented data structures to analyze and process transaction requests. In some embodiments, steps 1101-1104 in the example may be a continuation of the process steps 901-903, and may be performed by the same systems (e.g., by a single transaction analyzer 720). However, in other embodiments, the processes in these examples may be performed separately by independent systems and/or within separate data centers. For example, a first data analyzer system may be configured to receive and analyze transaction data from data sources 731-735, determine transaction data subsets, and generate graph-oriented data structures 725 (steps 901-903), while a second transaction processor system may be configured to receive transaction requests from client devices 710, review and analyze the transaction requests based on the graph-oriented data structures 725, and process the transaction requests accordingly (steps 1101-1104). Further, it should also be understood that the various features and processes described herein, including receiving and processing transaction requests based on graph-oriented data structures 725, need not be limited to the specific systems and hardware implementations described above in FIGS. 1-7.

Steps 1101-1104 relate to techniques of analyzing and processing transaction requests from users, based on previous transaction data stored as graph-oriented data structures 725. As described below in more detail, such techniques for analyzing and processing transaction requests may include comparing a new transaction request to the existing graph data structures using graph algorithms and graph analysis tools, pattern analysis tools, fuzzy logic, and the like. In some embodiments, such techniques may be used to evaluate a new transaction request and determine a level of confidence that the new transaction request data is consistent with the existing graph-oriented data structures 725. For instance, for a transaction request having a high level of consistent with the existing graph-oriented data structures 725, the transaction analyzer 720 may determine that the transaction is a typical transaction that is most likely valid and legitimate. In contrast, for a transaction request that is somewhat inconsistent with the existing graph-oriented data structures 725, the transaction analyzer 720 may determine that the transaction is atypical and should be rejected or analyzed further to address potential data security concerns, fraud, compliance, risk, etc. Such evaluations may be performed by the transaction analyzer 720 in real-time or near real-time in some cases, so that the transaction analyzer 720 may initially determine whether to approve, reject, postpone, or perform further analyses on the transaction request, while still maintaining the capabilities of responding to transaction requests and perform approved transactions promptly without unnecessary delays for client devices 710.

In step 1101, the transaction analyzer 720 may receive data from one or more transaction client devices 710 corresponding to a transaction request. The transaction request may correspond to a request from user to access the resources of the transaction system 700 via the client device 710, to perform any single-user or multi-user transaction supported by the system 700. As noted above, system 700 may correspond to any of several different types of electronic data transfer network, including a secure data transfer system 700, media content distribution system 700, social networking system 700, interactive gaming system 700, financial transaction system 700, and the like. Thus, the transaction request received in step 1101 may correspond to any user request received by any of the above systems, for example, a request simply to login to a server, a request to perform any of the user features supported by the system (e.g., access a user account or other secure data, send an email or instant message, use various social networking features, etc.), a request to perform a secure data transfer or value transfer to another user or client device 710, etc.

Depending on the type of transaction requested in step 1101, and the features and functionality of the system 700, various different data relating to the requested transaction may be received by the transaction analyzer 720. For example, certain transaction requests received in step 1101 may include a user identifier of the user initiating the request, a device identifier of the transaction client device 710, one or more identifiers corresponding to the communication channels and/or networks through which the request was received, and data identifying what system features and/or action(s) the user is attempting to invoke. For instance, for a user login request received in step 1101, the transaction request data may include the user's credentials (e.g., login and password), client device identifier, communication channel and network data, geographic data identifying the user's current location, etc. As another example, for a request to transfer secure data and/or perform a value transfer received in step 1101, the transaction request data may include the sending user's credentials, the sending user's client device 710a, the communication channels/networks associated with the sender's request, a recipient user identifier and/or a recipient client device identifier within the request, a transaction type, the identification of the resources and/or value to be transferred, and/or any other characteristics or conditions associated with the requested transfer.

In some embodiments, certain relevant data relating to a transaction requested in step 1101 may not be present in the transaction data received by the transaction analyzer 720 in step 1101. For example, certain systems 700 may support user anonymity for certain transactions (e.g., anonymous user logins, anonymous data access, anonymous sender data/value transfers, etc.), and thus the transaction data received in step 1101 might not include user data in such cases. Additionally, the use of certain communication channels, certain transmission networks, and/or certain geographic regions may obscure some information from the transaction analyzer 720 when transmitting a transaction request, and thus transaction data received in step 1101 may not include device identifiers, network data, communication channel data, and/or certain other transaction-related data in some cases.

In step 1102, the transaction analyzer 720 may compare the transaction request data received in step 1101 with the entities (e.g., nodes) represented in the one or more graph-oriented data structures 725 maintained by the system 700. For example, the user identifier(s) associated with a transaction request received in step 1101 may be matched to corresponding user entities in a graph data structure 725 (e.g., sender 1021 or a receiver 1022-1026). Similar comparisons may be used to match other transaction request data (e.g., client device identifiers, existing transaction identifiers, communication channel identifiers, etc.) to the nodes, edges, and/or properties of the graph-oriented data structure(s) 725 maintained by the system 700. For example, for a transaction initiated by a first user via a client device 710, the transaction analyzer 720 may retrieve a plurality of graph data structures 725 in step 1102, each separate graph data structure 725 storing the subset of cross-channel transaction data for a unique user pair.

In step 1103, the transaction analyzer 720 may identify one or more nodes within the graph-oriented data structure(s) 725 that match the transaction request data received in step 1101, and may use various tools and techniques to analyze the transaction request data based on the graph-oriented data structure(s) 725. In some embodiments the transaction analyzer 720 may compare the entities and relationships within the transaction request data (e.g., users, devices, communication channels, transaction requested details, etc.) with the previous transaction data in the graph-oriented data structures 725. The entities, relationships, and/or patterns within the graph-oriented data structures 725 may be compared to the transaction request data, for example, to determine a consistency metric for the newly requested transaction with respect to the graph-oriented data structures 725. The various tools and techniques used in such analyses may include, for example, graph algorithms, graph analysis tools, pattern analysis tools, fuzzy logic, and the like. These tools and techniques, among others, may be used to match the transaction request data with the graph-oriented data structures 725 representing previous transaction data, in order to quantify a level of consistency of the newly requested transaction with the previous transaction data.

As an example, if the transaction data received in step 1101 identifies two users for a requested transaction, along with additional transaction data (e.g., transaction details, client device(s), communication channels, etc.), then in step 1103 the transaction analyzer 720 may use the graph-oriented data structures 725 to determine that the requested transaction is similar or identical to a number of previous transactions between the same users having similar or identical characteristics, such as the same or related client devices 710, the same or similar communication channels, and the same or similar transaction details (e.g., resources/value amounts transferred, geographic locations, transaction time patterns, etc.). In this example, the transaction analyzer 720 may use fuzzy logic and/or graphical analysis tools to calculate a high level of consistency between the new transaction request and the previous transaction data stored in the graph data structures 725. In other examples, an analysis of the transaction request data in comparison to the graph-oriented data structures 725 may be used to determine high or low levels of consistency and adherence to the patterns of the previous transaction data. If a transaction request received in step 1101 shares similarities with some but not all of the graph nodes/entities, then the transaction analyzer 720 may nonetheless calculate a relatively high likelihood that the requested transaction is consistent with the previous transaction data in the graph-oriented data structures 725. For instance, a request for a sender-to-receiver data and/or value transfer include may have a number of entities and transaction characteristics in common with one or more previous transactions stored in the graph-oriented data structures 725, but may nonetheless identifies a different recipient, be initiated from a different client device 710 or through a different communication channel, etc. In such cases, the transaction analyzer 720 may use graph-based algorithms, fuzzy logic, pattern matching, and the like to determine the consistency of the transaction request with the graph-oriented data structures 725 to determine one or more value corresponding to the consistency of the transaction request with the previous transaction data received from data sources 731-735.

Additionally or alternatively, the analyses in step 1103 may include traversing the graph-oriented data structures 725 to identify any anomalies and/or potential risk factors near and/or connected to any nodes matching the transaction request data. To illustrate, using the graph-oriented diagram in FIG. 10, if a transaction request received in step 1101 corresponds to a transfer request from sender 1021 via client device 1010, then the transaction analyzer 720 may traverse the graph data structure shown in FIG. 10 to identify any risk factors and/or comprised entities among the closely related entity nodes. Thus, each previous transfer 1031-1041, and the recipients 1022-1026 associated with those transfers may be analyzed to identify any abnormalities, risk factors, and/or entities that are potentially compromised.

In such embodiments, for each entity within a transaction request data that corresponds to a node in a graph-oriented data structure 725, the transaction analyzer 720 may traverse the graph-oriented data structure 725 in all directions starting at that node, and may review and analyze the additional nodes encountered during the traversal to detect potentially comprised entities and other risk factors. Such traversals may be a N-level deep traversal (e.g., $1^{st}$ level nodes, $2^{nd}$ level nodes, $3^{rd}$ level nodes, etc.), where N is configurable by the transaction analyzer 720, and where the traversal follows the edges in the graph-oriented data structures 725 (which indicate previous interactions between nodes and/or previous common transactions involving the nodes). In some examples, the data received from data sources 731-735 may indicate potentially comprised entities, such as potentially comprised devices (e.g., devices on which malware or viruses were detected, devices reported stolen, devices associated with potentially fraudulent transactions or users, etc.), potentially comprised transactions (e.g., previous transactions flagged as fraudulent, invalid, or rejected, etc.), potentially comprised users (e.g., users compromised by identity theft, compromised email or login credentials, compromised social networking profile, compromised personal data, etc.), potentially comprised communication channels (e.g., insecure networks, networks or servers with malware detected, compromised client terminals or kiosks, compromised employees or agents associated with the communication channel, etc.), and the like. The data indicating that entities may be potentially compromised can be stored with the associated nodes and/or edges within the graph-oriented data structures 725. When the transaction analyzer 720 traverses the nodes during the analysis of a transaction request, it may identify the potentially comprised users/devices/channels/etc., and the relationships between the comprised entities and the entities of the current transaction request, in order to determine the likelihood that the current transaction request also may be comprised.

To illustrate, if a transaction request is received in step 1101 from a client device 710*a* that is one node removed from a compromised client device 710*b* (e.g., a client having malware or a virus) within a graph-oriented data structure 725, that level of closeness/interaction may represent a risk that the client device 710*a* also may be compromised. Similarly, if one or more other entities associated with the transaction request (e.g., users, devices, channels, etc.) are one node removed from a compromised user entity (e.g., a malicious user or a user whose credentials or personal data has been comprised, etc.). or a compromised communication channel, network, etc., then the transaction request also may have a higher risk of being comprised. A transaction request whose entities are two node-levels removed from any compromised entities within the graph-oriented data structure 725 may represent a lower risk than when compromised entities are only one node removed from the transaction request entities. However, the overall analysis of nearby compromised entities in step 1103 may include several factors, including the number of compromised entities (or potentially compromised entities) nearby, the distance (e.g., number of nodes-edges) that the compromised entities are removed from the transaction request entities, the severity of the potential security issues of the compromised entities, and the likelihood/level of certainty that the potentially compromised entities are actually compromised, etc. The transaction analyzer 720 may perform a node/edge traversal and calculate an overall risk that a current transaction request is comprised, based on the detection of one or more nearby compromised entities and the factors discussed above.

Further, as discussed above, certain transaction requests might not include data identifying the particular users (e.g., when anonymous user transactions are support), and/or might not include other relevant data (e.g., device identifiers, network data, communication channel data, etc.). In such examples, the analyses performed in step 1103 may include attempting to identify any relevant entity data (e.g., users, devices, communication channels, transaction data, etc.) that is missing from the transaction request received in step 1101. For example, similar or identical techniques using graph algorithms, pattern matching techniques, fuzzy logic, etc., may be used to determine (within certain probabilities) any entities missing from the transaction request data. For example, if a data/value transfer request is anonymous with respect to the sender and receiver, the transaction analyzer 720 may use the additional entity data included with the transaction request (e.g., client devices, communication channels, networks, geographic regions, languages, transaction types, data resources or values/amounts transferred, etc.) to infer the sender and receiver by matching the entities in the request to the graph-oriented data structures 725 storing previous transaction data. As discussed below, after determining a particular user pair associated with a transaction request, the graph-oriented data structures 725 also may be used to determine user pair score to evaluate the transaction for expedited authentication and/or processing (e.g., white glove treatment).

In step 1104, the transaction analyzer 720 may process the transaction request based on the analyses performed in step 1103. As discussed above, the transaction analyzer 720 may analyze the transaction request data and the graph-oriented data structures 725, to determine if the transaction request is typical of and consistent with the previous transaction data stored by the system 700, and/or to determine the likelihood that one or more entities associated with the transaction request may be potentially compromised. One or both of these analyses may be used by the transaction analyzer 720 during various transaction review/approval systems, including risk assessment systems, fraud detection systems, compliance systems, and the like. Depending on the results of the analyses in step 1103, a transaction request may be approved, denied, postponed, and/or forwarded for additional authentication and processing. In some cases, for multi-party transactions requiring actions by multiple users (e.g., a transaction initiation by a sender, and an acceptance/completion by a receiver), the transaction analyzer 720 may determine and implement the level of security and authentication required based on the analyses in step 1103. For instance, for a transaction request between a trusted sender-receiver pair, and no detection of compromised entities affecting the transaction, then the transaction analyzer 720 may provide expedited processing of transaction, minimal requirements for user authentication and security measures, etc. In contrast, for a transaction request between unknown or unverified senders and receivers, and/or when potentially compromised entities are detected near or in relation to the entities of the transaction request, then the transaction analyzer 720 may require enhanced authentication (e.g., multi-factor user authentication, in-person user authentication, etc.) and/or additional transaction security measures (e.g., secure protocols, encryption, maximum transfer values, etc.). Additionally, in some cases, the transaction analyzer 720 may require a postponement and second analysis step 1103 to be performed, after a waiting period during which additional transaction data is received from data sources 731-735 and the graph-oriented data structures 725 have been updated.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A transaction analyzer system comprising:
   one or more data source servers, each data source server comprising:
   a processing unit comprising one or more processors;
   one or more storage devices configured to receive and store data associated with a plurality of transactions relating to a plurality of entities;
   a network interface configured to transmit data to a transaction analyzer server; and
   memory coupled with and readable by the processing unit and storing therein a set of instructions which, when executed by the processing unit, causes the data source server to:
   receive and store a plurality of transaction data including entity data associated with the plurality of transaction data, wherein one or more of the plurality of transaction data indicates one or more data transfers transmitted via one or more communication channels; and
   transmit the plurality of transaction data to the transaction analyzer server;
   one or more transaction client devices, each transaction client device comprising:
   a processing unit comprising one or more processors;
   an input/output (I/O) subsystem configured to receive transaction request data; and
   a network interface configured to securely communicate transaction request data to the transaction analyzer server;
   memory coupled with and readable by the processing unit and storing therein a set of instructions which, when executed by the processing unit, causes the transaction client device to:
   receive data via the I/O subsystem corresponding to one or more transaction requests; and transmit the data corresponding to the transaction requests via the network interface to the transaction analyzer server; and the transaction analyzer server, wherein the transaction analyzer server comprises one or more computer servers configured to communicate with the one or more data source servers and the one or more transaction client devices, wherein the one or more computer servers of the transaction analyzer server comprise:
one or more processing units, each processing unit comprising one or more processors; and
one or more memory devices respectively coupled to and readable by the one or more processing units, the memory devices storing therein one or more sets of instructions which, when executed by the processing units, causes one or more computer servers of the transaction analyzer server to:
receive the plurality of transaction data from each of the one or more data source servers;
determine a first subset of the received transaction data relating to interactions between a first user and a second user;
automatically generate a first graph-oriented data structure based on the first subset of the received transaction data relating to the interactions between the first user and the second user, the first graph-oriented data structure including at least a plurality of nodes corresponding to entities, and a plurality of edges defining connections between the plurality of nodes, wherein a first node of the plurality of nodes is a representation of a communication channel of the one or more communication channels utilized for one or more interactions between the first user and the second user, and a second node of the plurality of nodes is a representation of a device utilized to facilitate one or more interactions between the first user and the second user;
receive transaction data from a first transaction client device, the transaction data identifying at least one entity associated with a first requested transaction;
compare the at least one entity associated with the first requested transaction to the plurality of nodes corresponding to entities within the first graph-oriented data structure;
in response to determining that a first entity associated with the first requested transaction matches a first node within the first graph-oriented data structure, use a graph algorithm to traverse the first graph-oriented data structure and retrieve additional data from the first graph-oriented data structure; and
process the first requested transaction based on the additional data retrieved from the first graph-oriented data structure.

2. The transaction analyzer system of claim 1, wherein the transaction data received from the first transaction client device identifies the first user and the second user as being associated with the first requested transaction, and wherein processing the first requested transaction comprises:
determining a user pair score associated with the combination of the first user and the second user, using the first graph-oriented data structure;
comparing the user pair score with one or more transaction thresholds; and
processing the first requested transaction, based on a comparison of the user pair score to the one or more transaction thresholds.

3. The transaction analyzer system of claim 2, wherein processing the first requested transaction further comprises:
based on the comparison of the user pair score to a first transaction threshold, postponing resolution of the first requested transaction until after a second determination of the user pair score, the second determination of the user pair score performed in response to receipt of additional transaction data from a second transaction client device associated with the first requested transaction.

4. The transaction analyzer system of claim 1, wherein the transaction data received from the first transaction client device does not identify at least one of the first user or the second user as being associated with the first requested transaction, and wherein processing the first requested transaction comprises:
determining an identity of the first user and the second user associated with the first requested transaction, using the first graph-oriented data structure, based on the transaction data received from the first transaction client device.

5. The transaction analyzer system of claim 1, wherein processing the first requested transaction comprises:
determining an identity of a third user having one or more previous interactions with the first user, using the first graph-oriented data structure;
accessing a second graph-oriented data structure relating to the interactions between the first user and the third user;
retrieving data from the second graph-oriented data structure, said data relating to one or more previous interactions between the first user and the third user; and
processing the first requested transaction based on the data retrieved from the second graph-oriented data structure.

6. The transaction analyzer system of claim 1, wherein the plurality of transaction data received from the one or more data source servers includes a plurality of transaction data relating to interactions between a first user and a second user performed over a plurality of separate communication channels of the one or more communication channels.

7. The transaction analyzer system of claim 6, wherein the received transaction data associated with the first requested transaction comprises data identifying one or more user entities associated with the first requested transaction, wherein the transaction analyzer server is further configured to:
identify, within the first graph-oriented data structure, a plurality of matching nodes corresponding to the one or more user entities, one or more device, or the one or more communication channels within the transaction data associated with the first requested transaction, the plurality of matching nodes including the first node;
traverse the first graph-oriented data structure, starting at each of the plurality of matching nodes, out to a predetermined level of nodes removed from the plurality of matching nodes; and
for each of a plurality of additional nodes encountered during the traversal of the first graph-oriented data structure, retrieve data indicating whether or not the additional node corresponds to a potentially compromised entity.

8. A method of analyzing and processing requested transactions, comprising:

transmitting a plurality of transaction data, from a data source server to a transaction analyzer server, the transaction data including entry data associated with the plurality of transaction data, and the transaction data having been received and stored from the data source server;

transmitting a first transaction request to the transaction analyzer server, by a transaction client device, the first transaction request including data identifying at least one entity associated with a first requested transaction;

receiving, by a transaction analyzer server, a plurality of transaction data from one or more data source servers, wherein one or more of the plurality of transaction data indicates one or more data transfers transmitted via one or more communication channels;

determining, by the transaction analyzer server, a first subset of the received transaction data relating to interactions between a first user and a second user;

automatically generating, by the transaction analyzer server, a first graph-oriented data structure based on the first subset of the received transaction data relating to the interactions between the first user and the second user, the first graph-oriented data structure including at least a plurality of nodes corresponding to entities, and a plurality of edges defining connections between the plurality of nodes, wherein a first node of the plurality of nodes is a representation of a communication channel of the one or more communication channels utilized for one or more interactions between the first user and the second user, and a second node of the plurality of nodes is a representation of a device utilized to facilitate one or more interactions between the first user and the second user;

receiving, by the transaction analyzer server, a first transaction request including data identifying at least one entity associated with the first requested transaction;

comparing, by the transaction analyzer server, the at least one entity associated with the first requested transaction to the plurality of nodes corresponding to entities within the first graph-oriented data structure;

using, by the transaction analyzer server, a graph algorithm to traverse the first graph-oriented data structure and retrieve additional data from the first graph-oriented data structure, in response to determining that a first entity associated with the first requested transaction matches a first node within the first graph-oriented data structure; and processing, by the transaction analyzer server, the first requested transaction based on the additional data retrieved from the first graph-oriented data structure.

9. The method of claim 8, wherein the first transaction request identifies the first user and the second user as being associated with the first requested transaction, and wherein processing the first requested transaction comprises:

determining a user pair score associated with the combination of the first user and the second user, using the first graph-oriented data structure;

comparing the user pair score with one or more transaction thresholds; and processing the first requested transaction, based on a comparison of the user pair score to the one or more transaction thresholds.

10. The method of claim 9, wherein processing the first requested transaction further comprises:

based on the comparison of the user pair score to a first transaction threshold, postponing resolution of the first transaction request until after a second determination of the user pair score, the second determination of the user pair score performed in response to receipt of additional transaction data associated with the first requested transaction.

11. The method of claim 8, wherein the first transaction request does not identify at least one of the first user or the second user as being associated with the first requested transaction, and wherein processing the first requested transaction comprises:

determining an identity of the first user and the second user associated with the first requested transaction, using the first graph-oriented data structure, based on the data identifying the at least one entity associated with the first requested transaction received in the first transaction request.

12. The method of claim 8, wherein processing the first requested transaction comprises:

determining an identity of a third user having one or more previous interactions with the first user, using the first graph-oriented data structure;

accessing a second graph-oriented data structure relating to the interactions between the first user and the third user;

retrieving data from the second graph-oriented data structure, said data relating to one or more previous interactions between the first user and the third user; and processing the first requested transaction based on the data retrieved from the second graph-oriented data structure.

13. The method of claim 8, wherein the plurality of transaction data received from the one or more data source servers includes a plurality of transaction data relating to interactions between a first user and a second user performed over a plurality of separate communication channels of the one or more communication channels.

14. The method of claim 13, wherein the received transaction data associated with the first requested transaction comprises data identifying one or more user entities associated with the first requested transaction, wherein the method comprises:

identifying, within the first graph-oriented data structure, a plurality of matching nodes corresponding to the one or more user entities, one or more device, or the one or more communication channels within the transaction data associated with the first requested transaction, the plurality of matching nodes including the first node;

traversing the first graph-oriented data structure, starting at each of the plurality of matching nodes, out to a predetermined level of nodes removed from the plurality of matching nodes; and for each of a plurality of additional nodes encountered during the traversal of the first graph-oriented data structure, retrieving data indicating whether or not the additional node corresponds to a potentially compromised entity.

15. A non-transitory, computer-readable medium storing computer-executable instructions that are executable by one or more processors, the computer-executable instructions that cause the one or more processors to:

transmit a plurality of transaction data, from a data source server to a transaction analyzer server, the transaction data including entity data associated with the plurality of transaction data, and the transaction data having been received and stored from the data source server;

transmit a first transaction request to the transaction analyzer server, by a transaction client device, the first transaction request including data identifying at least one entity associated with a first requested transaction;

receive a plurality of transaction data from one or more data source server, wherein one or more of the plurality of transaction data indicates one or more data transfers transmitted via one or more communication channels;

determine a first subset of the received transaction data relating to interactions between a first user and a second user;

automatically generate a first graph-oriented data structure based on the first subset of the received transaction data relating to the interactions between the first user and the second user, the first graph-oriented data structure including at least a plurality of nodes corresponding to entities, and a plurality of edges defining connections between the plurality of nodes, wherein a first node of the plurality of nodes is a representation of a communication channel of the one or more communication channels utilized for one or more interactions between the first user and the second user, and a second node of the plurality of nodes is a representation of a device utilized to facilitate one or more interactions between the first user and the second user;

receive the first transaction request from the transaction client device;

compare the at least one entity associated with the first requested transaction to the plurality of nodes corresponding to entities within the first graph-oriented data structure;

use a graph algorithm to traverse the first graph-oriented data structure and retrieve additional data from the first graph-oriented data structure, in response to determining that a first entity associated with the first requested transaction matches a first node within the first graph-oriented data structure; and process the first requested transaction based on the additional data retrieved from the first graph-oriented data structure.

16. The non-transitory, computer-readable medium of claim 15, wherein the first transaction request identifies the first user and the second user as being associated with the first requested transaction, and wherein processing the first requested transaction comprises steps to:

determining a user pair score associated with the combination of the first user and the second user, using the first graph-oriented data structure;

comparing the user pair score with one or more transaction thresholds; and processing the first requested transaction, based on a comparison of the user pair score to the one or more transaction thresholds.

17. The non-transitory, computer-readable medium of claim 16, wherein processing the first requested transaction further comprises steps to:

based on the comparison of the user pair score to a first transaction threshold, postponing resolution of the first transaction request until after a second determination of the user pair score, the second determination of the user pair score performed in response to receipt of additional transaction data associated with the first requested transaction.

18. The non-transitory, computer-readable medium of claim 15, wherein the first transaction request does not identify at least one of the first user or the second user as being associated with the first requested transaction, and wherein processing the first requested transaction comprises steps to:

determining an identity of the first user and the second user associated with the first requested transaction, using the first graph-oriented data structure, based on the data identifying the at least one entity associated with the first requested transaction received in the first transaction request.

19. The non-transitory, computer-readable medium of claim 15, wherein processing the first requested transaction comprises steps to:

determining an identity of a third user having one or more previous interactions with the first user, using the first graph-oriented data structure;

accessing a second graph-oriented data structure relating to the interactions between the first user and the third user;

retrieving data from the second graph-oriented data structure, said data relating to one or more previous interactions between the first user and the third user; and processing the first requested transaction based on the data retrieved from the second graph-oriented data structure.

20. The non-transitory, computer-readable medium of claim 15, wherein the received transaction data associated with the first requested transaction comprises data identifying one or more user entities associated with the first requested transaction, wherein the computer-executable instructions further that cause the one or more processors to:

identify, within the first graph-oriented data structure, a plurality of matching nodes corresponding to the one or more user entities, one or more device, or the one or more communication channels within the transaction data associated with the first requested transaction, the plurality of matching nodes including the first node;

traverse the first graph-oriented data structure, starting at each of the plurality of matching nodes, out to a predetermined level of nodes removed from the plurality of matching nodes; and retrieve data indicating whether or not the additional node corresponds to a potentially compromised entity, for each of a plurality of additional nodes encountered during the traversal of the first graph-oriented data structure.

* * * * *

UNITED STATES PATENT AND TRADEMARK OFFICE
CERTIFICATE OF CORRECTION

PATENT NO. : 10,721,336 B2  
APPLICATION NO. : 15/403414  
DATED : July 21, 2020  
INVENTOR(S) : Abhishek Banerjee et al.

Page 1 of 1

It is certified that error appears in the above-identified patent and that said Letters Patent is hereby corrected as shown below:

In the Claims

In Claim 1, Column 35, Line 28, delete "including" and insert -- graphically representing --

In Claim 2, Column 35, Line 63, delete "the" and insert -- a --

In Claim 8, Column 37, Line 34, delete "a first" and insert -- the first --

In Claim 8, Column 37, Lines 35 and 36, delete "including data identifying at least one entity associated with the first requested" and insert -- from the --

In Claim 8, Column 37, Line 36, after the word transaction, insert -- client device --

In Claim 16, Column 39, Line 44, delete "determining" and insert -- determine --

In Claim 16, Column 39, Line 49, delete "processing" and insert -- process --

In Claim 18, Column 40, Line 12, delete "determining" and insert -- determine --

In Claim 19, Column 40, Line 21, delete "determining" and insert -- determine --

In Claim 19, Column 40, Line 24, delete "accessing" and insert -- access --

In Claim 19, Column 40, Line 27, delete "retrieving" and insert -- retrieve --

In Claim 19, Column 40, Line 30, delete "processing" and insert -- process --

Signed and Sealed this  
Thirty-first Day of August, 2021

Drew Hirshfeld  
*Performing the Functions and Duties of the*  
*Under Secretary of Commerce for Intellectual Property and*  
*Director of the United States Patent and Trademark Office*